United States Patent
Rudd et al.

(10) Patent No.: US 11,421,983 B2
(45) Date of Patent: Aug. 23, 2022

(54) STRUCTURED LIGHT PROJECTION FOR SPECULAR SURFACES

(71) Applicant: CyberOptics Corporation, Golden Valley, MN (US)

(72) Inventors: Eric P. Rudd, Hopkins, MN (US); Carl E. Haugan, St. Paul, MN (US); Paul R. Haugen, Bloomington, MN (US)

(73) Assignee: CyberOptics Corporation, Golden Valley, MN (US)

( * ) Notice: Subject to any disclaimer, the term of this patent is extended or adjusted under 35 U.S.C. 154(b) by 0 days.

(21) Appl. No.: 16/256,460

(22) Filed: Jan. 24, 2019

(65) Prior Publication Data

US 2019/0226835 A1 Jul. 25, 2019

Related U.S. Application Data

(60) Provisional application No. 62/621,317, filed on Jan. 24, 2018.

(51) Int. Cl.
*G01B 11/25* (2006.01)
*H04N 5/225* (2006.01)
(Continued)

(52) U.S. Cl.
CPC ........ *G01B 11/254* (2013.01); *G01B 11/0608* (2013.01); *G01B 11/2504* (2013.01);
(Continued)

(58) Field of Classification Search
CPC ............... G01B 11/254; G01B 11/2504; G01B 11/2513; G01B 11/0608; G02B 27/0955; H04N 5/2256; G06K 9/00201
See application file for complete search history.

(56) References Cited

U.S. PATENT DOCUMENTS 5,105,149 A * 4/1992 Tokura ................ G01R 31/308
348/126
5,917,940 A 6/1999 Okajima et al.
(Continued)

FOREIGN PATENT DOCUMENTS

CN 101738728 A 6/2010
CN 101813460 A 8/2013
(Continued)

OTHER PUBLICATIONS

Zhou Y. "Calibrating Slope-Dependent Errors in Profilometry, A dissertation submitted to the Optical Science and Engineering Department at the University of North Carolina, 2014" (Year: 2014).*

(Continued)

*Primary Examiner* — Richard A Hansell, Jr.
(74) *Attorney, Agent, or Firm* — Christopher R. Christensen; Kelly, Holt & Christenson PLLC

(57) ABSTRACT

A system for generating a three-dimensional height image of a reflective target includes an illumination source configured to generate a patterned illumination on the reflective target, and an imaging system configured to acquire an image of the patterned illumination on the reflective target, the illumination source and camera being aligned relative to the target such that the camera acquires a specular image of the patterned illumination. The system further including a controller coupled to the illumination source and the camera configured to generate a first height image of the target based on the acquired image, the first height image being used by the controller to determine a position, a height, and a tilt of the target and calculate an error function based on the determination to compensate the first height image for the calculated error.

22 Claims, 24 Drawing Sheets

(51) Int. Cl.
  *G02B 27/09* (2006.01)
  *G01B 11/06* (2006.01)
  *G06V 20/64* (2022.01)

(52) U.S. Cl.
  CPC ...... *G01B 11/2513* (2013.01); *G02B 27/0955* (2013.01); *G06V 20/64* (2022.01); *H04N 5/2256* (2013.01)

(56) References Cited

U.S. PATENT DOCUMENTS

| | | | | |
|---|---|---|---|---|
| 6,011,624 | A * | 1/2000 | de Groot | G01B 11/303 356/511 |
| 6,925,860 | B1 * | 8/2005 | Poris | G01B 11/0608 73/1.79 |
| 7,440,590 | B1 * | 10/2008 | Hassebrook | G01B 11/2513 359/263 |
| 9,726,876 | B2 | 8/2017 | Bryll | |
| 9,798,130 | B2 * | 10/2017 | Dresel | G01B 11/2522 |
| 2006/0044648 | A1 | 3/2006 | Akiyama et al. | |
| 2007/0023716 | A1 | 2/2007 | Van Der Burgt et al. | |
| 2007/0091318 | A1 * | 4/2007 | Freishlad | G01B 9/0209 356/497 |
| 2007/0229658 | A1 * | 10/2007 | Kanamori | G06T 3/40 348/207.99 |
| 2008/0279446 | A1 | 11/2008 | Hassebrook et al. | |
| 2009/0088999 | A1 * | 4/2009 | Bryll | G01B 21/045 382/141 |
| 2009/0219515 | A1 | 9/2009 | Spennemann et al. | |
| 2010/0315422 | A1 * | 12/2010 | Andre | G01B 11/2513 345/426 |
| 2012/0105586 | A1 * | 5/2012 | Miesak | G06V 10/145 348/46 |
| 2012/0276177 | A1 * | 11/2012 | Hilliard, Jr | A61K 8/26 428/338 |
| 2012/0287198 | A1 * | 11/2012 | Barss | B41J 2/125 347/19 |
| 2014/0071459 | A1 | 3/2014 | Nakatsukasa | |
| 2014/0152794 | A1 | 6/2014 | Takahashi | |
| 2014/0320633 | A1 | 10/2014 | Haugen | |
| 2015/0092992 | A1 | 4/2015 | Ishihara | |
| 2016/0048969 | A1 * | 2/2016 | Zhao | G01B 11/0608 348/136 |
| 2016/0078610 | A1 | 3/2016 | Rudd | |
| 2016/0261851 | A1 | 9/2016 | Tian et al. | |
| 2016/0377412 | A1 | 12/2016 | Li et al. | |
| 2017/0132790 | A1 * | 5/2017 | Jeong | H04N 5/2226 |
| 2017/0132801 | A1 | 5/2017 | Trenholm et al. | |
| 2017/0257539 | A1 * | 9/2017 | Kokubo | C12M 41/36 |
| 2017/0268990 | A1 | 9/2017 | Martinello et al. | |
| 2018/0180883 | A1 | 6/2018 | Akishiba et al. | |
| 2018/0275390 | A1 | 9/2018 | Harsila | |
| 2018/0315297 | A1 | 11/2018 | Quaedackers | |
| 2012/2021843 | | 8/2021 | Hermary et al. | |

FOREIGN PATENT DOCUMENTS

| | | | |
|---|---|---|---|
| CN | 105372803 A | 3/2016 | |
| EP | 2377464 A1 | 10/2011 | |
| EP | 3396306 A1 | 10/2018 | |
| WO | WO-0151887 A1 * | 7/2001 | ......... G01B 11/2518 |
| WO | 2016188881 A1 | 1/2016 | |

OTHER PUBLICATIONS

International Search Report and Written Opinion dated April 29, 2019, for International Patent Application No. PCT/US2019/014981, 10 pages.
Jason Geng "Structured-light 3D Surface Imaging: a tutorial" Advances in Optics and Photonics, Mar. 31, 2011, vol. 3, Issue 2, pp. 128-160.
Non-Final Office Action for U.S. Appl. No. 16/256,579 dated Dec. 23, 2019, 11 pages.
First Office Action for Korean Patent Application No. 10-2020-7022992 dated Mar. 17, 2021, 11 pages including English translation.
International Search Report and Written Opinion dated Aug. 7, 2019, for International Patent Application No. PCT/US2019/014776, 12 pages.
Yang, Z. Kessel, A. and Häusler, G., 2015. Better 3D inspection with structured illumination: signal formation and precision. Applied optics, 54(22), pp. 6652-6660.
Written Opinion dated Aug. 19, 2021, for Singaporean Patent Application No. 11202006860U, 5 pages.
First Office Action dated Sep. 1, 2021, for Chinese Patent Application No. 201980009894.1, 19 pages including English translation.
Extended Search Report dated Sep. 20, 2021, for European Patent Application No. 17943536.5, 7 pages.
First Office Action dated Sep. 18, 2021, for Chinese Patent Application No. 201980009842.4, 25 pages including English translation.
Extended Search Report dated Nov. 5, 2021, for European Patent Application No. 19744481.3 7 pages.
Korean Office Action dated Nov. 30, 2021, for Korean Patent Application No. 10-2020-7023706, 12 pages including English translation.
First Office Action dated Feb. 9, 2022, for Chinese Patent Application No. 201980009894.1, 14 pages including English translation.
Second Office Action dated June 6. 2022, for Chinese Patent Application No. 201980009894.1, 23 pages including English translation.
Office Action dated June 24, 2022, for Korean Patent Application No. 10-2020-7023706. 7 pages including English translation.

* cited by examiner

STRUCTURED LIGHT PROJECTION FOR SPECULAR SURFACES

CROSS-REFERENCE TO RELATED APPLICATIONS

The present application is based on and claims the benefit of U.S. Provisional Patent Application Ser. No. 62/621,317, filed Jan. 24, 2018, the content of which is hereby incorporated by reference in its entirety.

BACKGROUND

Obtaining precision dimensional information relative to a surface or an object is vital to many industries and processes. For example, in the electronics assembly industry, precision dimensional information relative to an electrical component on a circuit board can be used to determine whether the component is placed properly. Further, dimensional information is also useful in the inspection of solder paste deposits on a circuit board prior to component mounting in order to ensure that a proper amount of solder paste is deposited in the proper location on the circuit board. Further still, dimensional information is also useful in the inspection of semi-conductor wafers and flat panel display.

Optical phase profilometry systems have been employed to accurately measure and obtain precision dimensional information relative to a surface or an object. However, some new electronic assemblies include components with reflective specular surfaces. Traditional systems, which are generally configured to measure diffuse, non-reflective surfaces, have trouble obtaining precise dimensional information for such components. As the precision of dimensional information for such components becomes more and more vital to various industries and processes, it becomes more and more important to accurately measure and obtain such information and to correct for the various causes of system disturbances related to the observation of assemblies containing specular surfaces.

SUMMARY

A system for generating a three-dimensional height image of a reflective target includes an illumination source configured to generate a patterned illumination on the reflective target, and an imaging system configured to acquire an image of the patterned illumination on the reflective target, the illumination source and camera being aligned relative to the target such that the camera acquires a specular image of the patterned illumination. The system further including a controller coupled to the illumination source and the camera configured to generate a first height image of the target based on the acquired image, the first height image being used by the controller to determine a position, a height, and a tilt of the target and calculate an error function based on the determination to compensate the first height image for the calculated error.

DETAILED DESCRIPTION

Optical phase profilometry systems are often employed in various industries and processes to obtain precision dimensional information relative to a surface or an object. For instance, these systems can be used to measure the height and position of various components. For example, in the electronics industry, many electronic assemblies include devices mounted on circuit boards. To ensure correct dimensions and placement of such devices, illumination sources project an illumination onto a target surface or object. The image, which is reflected from the target surface or object, is captured by an imaging system (e.g. a camera). The optical phase profilometry system calculates the dimensions of target surface or object by measuring the phase or position of the projected illumination at a particular point of the image (e.g. pixel) captured by the imaging system.

Some of these devices have specular, reflective surfaces that, like a mirrored surface, reflect light in only one direction. Typical optical phase profilometry systems have difficulties obtaining precise dimensional information relative to specular targets because the dimensional measurements for specular targets are a function of both the height and the tilt of the target. The position of the target (e.g. the height or tilt) can be affected by many variables, such as, but not limited to, design choice, operator or machine error, incorrect coupling (e.g. soldering), incorrect placement, and various other errors.

There is a desire to measure specular surfaces, such as polished silicon chips. If the optical profilometry system's geometry is altered such that the illumination source and imaging system have equal and opposite tilts, the specular target is imaged, and, being stronger than the diffuse return by roughly a factor of $1/(\text{Numerical Aperture})^2$ it becomes, by far, the dominant reflection. It is tempting to assume that this sensing geometry behaves similarly to the diffuse geometry, that is, if a diffuse target were substituted for the specular one, the results would be identical. However, this is not the case. The derived height is sensitive to the illumination of the pupils, and this problem becomes especially apparent if the specular target is tilted, which as mentioned above, is very often the case.

As the need for obtaining precise dimensional information for specular targets becomes more and more vital for various industries and processes, an optical profilometry system that can accurately measure the dimensions of specular targets and correct for the reflective effects of a specular target is needed. Such systems, techniques, and methods are provided below.

While some of the Figures below show optical profilometry systems with only one operative pair of an illumination source and imaging system, it is fully contemplated that optical profilometry systems with multiple operative pairs of illumination sources and imaging systems could be used.

Figure 1:
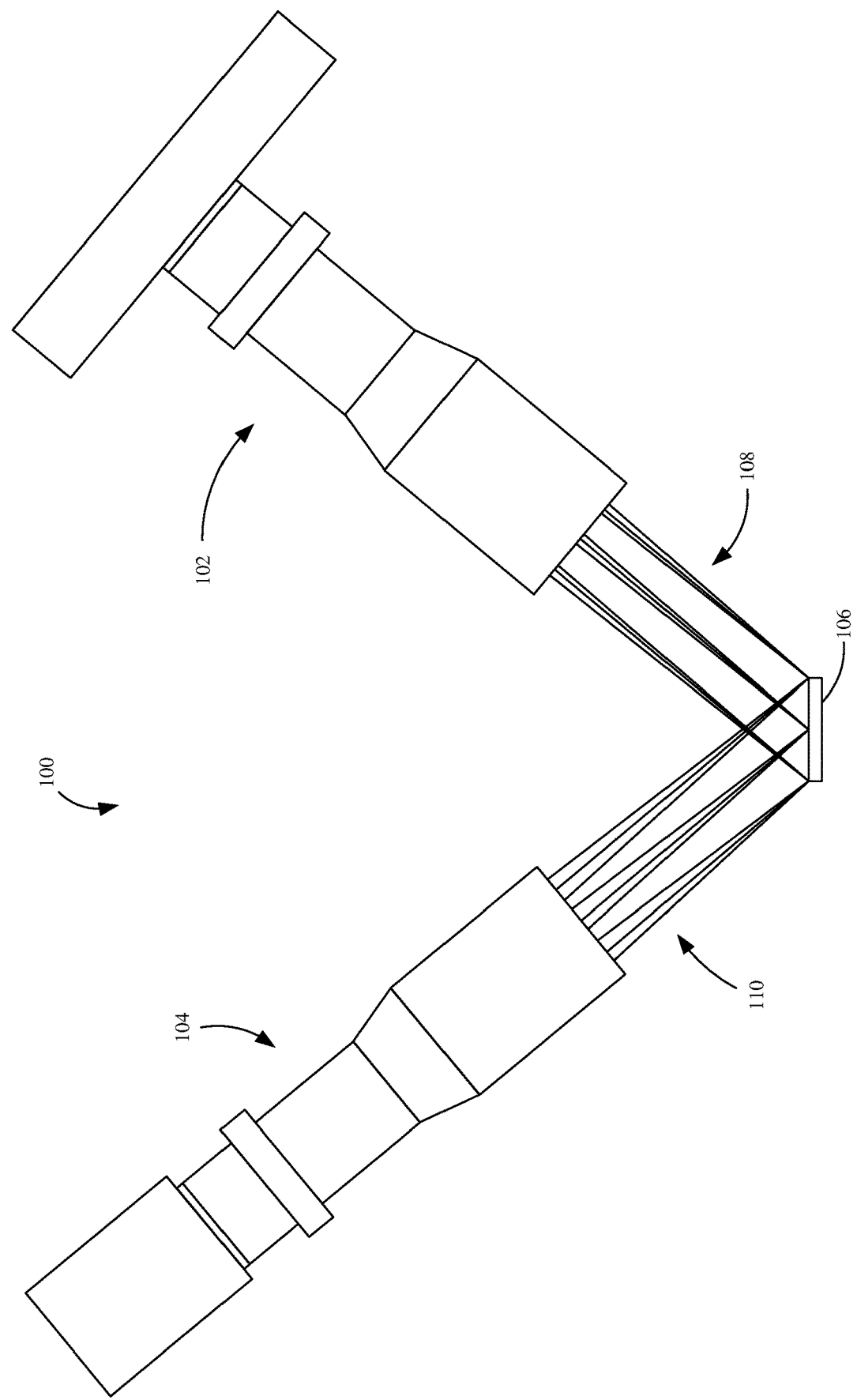
FIG. 1 is a perspective view showing one example of an optical profilometry system in accordance with an embodiment of the present invention.

FIG. 1 is a perspective view showing one example of an optical profilometry system in accordance with an embodiment of the present invention. System 100 includes illumination source 102, imaging system 104, target 106, illumination 108, and reflection 110. As set forth above, it is contemplated that multiple projector-camera pairs could be used in such a system. Illumination source 102 is positioned relative to target 106 and projects illumination 108 towards target 106. Imaging system 104 is positioned relative to target 106 and illumination source 102. Illumination 108 is projected onto target 106 and reflection 110 is directed towards imaging system 104. Illumination 108 could comprise multiple structured light patterns, such as a repeated sinusoidal intensity pattern or any other suitable technique for illuminating a target such that dimensional information may be obtained relative to that target. Imaging system 104 is depicted as a camera imaging system configured to acquire an image of the target illuminated by the illumination source but could comprise any number of suitable techniques for capturing an image projected by an illumination source.

As shown in FIG. 1 the lens assemblies for both illumination source 102 and imaging system 104 are telecentric, which is represented by the pathways of both illumination 108 and reflection 110. If non-telecentric lens assemblies were used, illumination 108 from illumination source 102 would be diverging as it hit target 106 and reflection 110 would miss imaging system 104. By using telecentric lens assemblies, the source illumination angle and the imaging angle are equal across target 106, ensuring the specular reflection is captured over the entire system's field of view. Light produced by illumination source 102 enters a multi-element telecentric lens assembly, becomes substantially parallel and thus highly concentrated as it exits illumination source 102. Thus, nearly all the light produced by illumination source 102 hits target 106 and reflection 110 is directed towards imaging system 104 in a specular manner. Target 106 is shown as a specular target. Target 106 could comprise a silicon device (e.g. silicon chip), or any other device with a specular or mirror-like surface.

In one embodiment, illumination source 102 has a small numerical aperture. In one embodiment the pupil of one device (either illumination source 102 or imaging system 104) completely encloses the pupil of the other device. In one embodiment, the numerical aperture of imaging system 104 is large enough to receive the entire projected bundle of rays of illumination 108 for all potential tilts of target 106. In another embodiment, the numerical aperture of illumination source 102 is large enough to completely flood the numerical aperture of imaging system 104 for all potential tilts of target 106. In another embodiment, the numerical apertures of illumination source 102 and imaging system 104 are equivalent.

Figure 2:
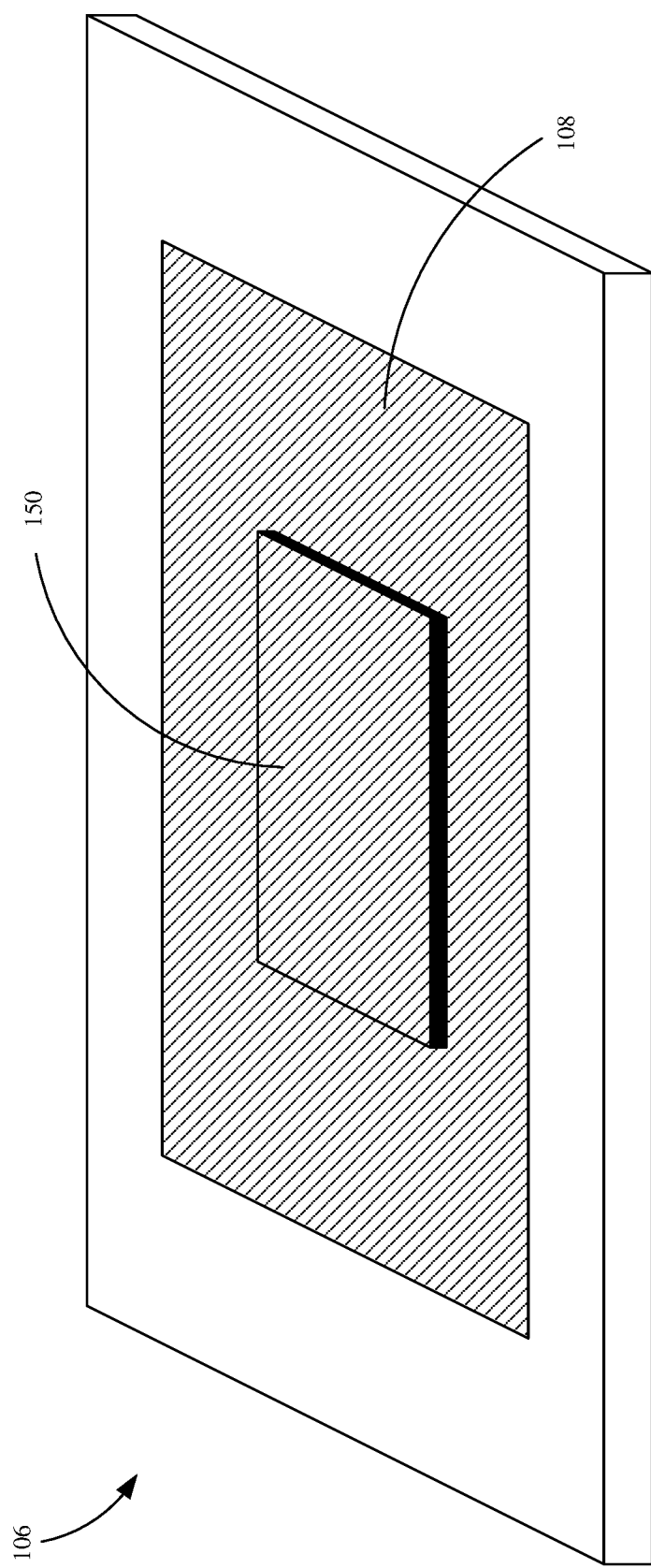
FIG. 2 is a perspective view showing one example of an optical profilometry system target.

FIG. 2 is a perspective view showing one example of an optical profilometry system target. Target 106 includes illumination 108 and specular device 150. Illumination 108 is projected onto target 106 by an illumination source (e.g. source 102). Illumination 108 is projected over specular device 150 such that dimensional information relative to specular device 150 may be obtained by an imaging system (e.g. system 104). Target 106 could comprise a reflective variable device comprising both specular and diffuse surfaces. For example, target 106 could comprise a circuit board having specular devices (e.g. device 150) such as silicon chips. Target 106 could be a wholly specular device or a wholly diffuse device. Illumination 108 can be a patterned illumination, such as a repeated sinusoidal intensity pattern, or any other illumination techniques such that dimensional information relative to target 106 or device 150 can be obtained by an imaging system (e.g. system 104).

Figure 3:
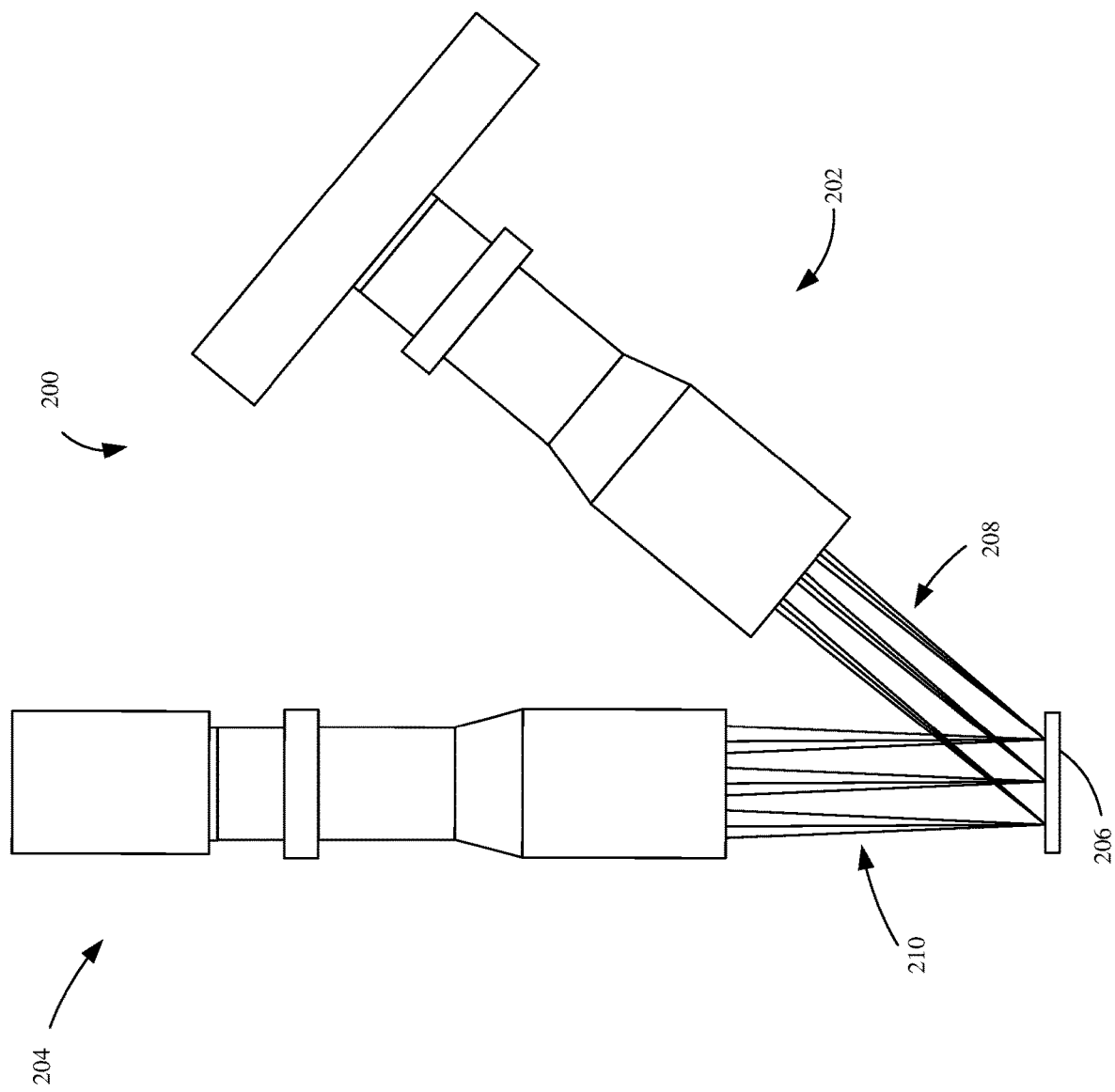
FIG. 3 is a perspective view showing one example of an optical profilometry system in accordance with the prior art.

FIG. 3 is a perspective view showing one example of an optical profilometry system in accordance with the prior art. System 200 includes illumination source 202, imaging system 204, diffuse target 206, illumination 208, and reflection 210. System 200 depicts the typical configuration of illumination source 202 and imaging system 204 in accordance with the prior art. Illumination source 202 projects illumination 208 onto diffuse target 206. Reflection 210 reflects from diffuse target 206 and is captured by imaging system 204, such that dimensional information relative to diffuse target 206 may be obtained.

Figure 4:
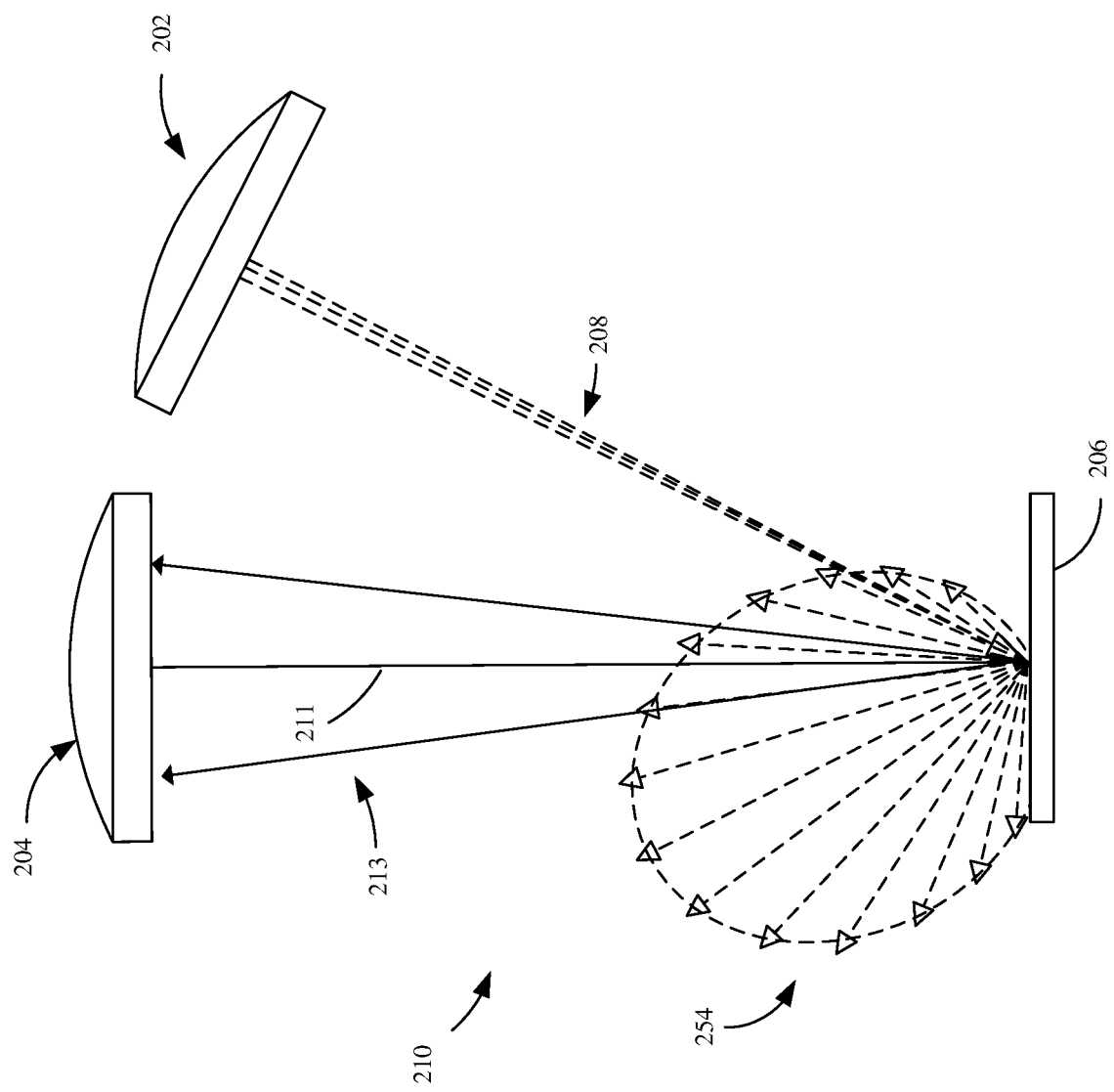
FIG. 4 is a diagrammatic view showing one example of an optical profilometry system in accordance with the prior art.

FIG. 4 is a diagrammatic view showing one example of an optical profilometry system in accordance with the prior art. System 200 includes illumination source 202, imaging system 204, diffuse target 206, illumination 208, reflection 210, chief ray 211, received ray bundle 213, and diffuse reflection pathways 254. System 200 is shown in the same configuration as in FIG. 3. Illumination 208 is projected unto diffuse target 206 by illumination source 202 and reflection 210 is reflected from diffuse target 206 and received ray bundle 213 is captured by imaging system 204. Chief ray 211 represents the ray pathway towards the center of image system 204. Diffuse target 206 scatters the incident light (e.g. reflection 210) in all directions as represented by diffuse reflection pathways 254. Because the incident light is scattered in all directions, imaging system 204 can be placed in a variety of positions relative to target 206 and illumination source 202 and still captures a portion of reflection 210.

Figure 5:
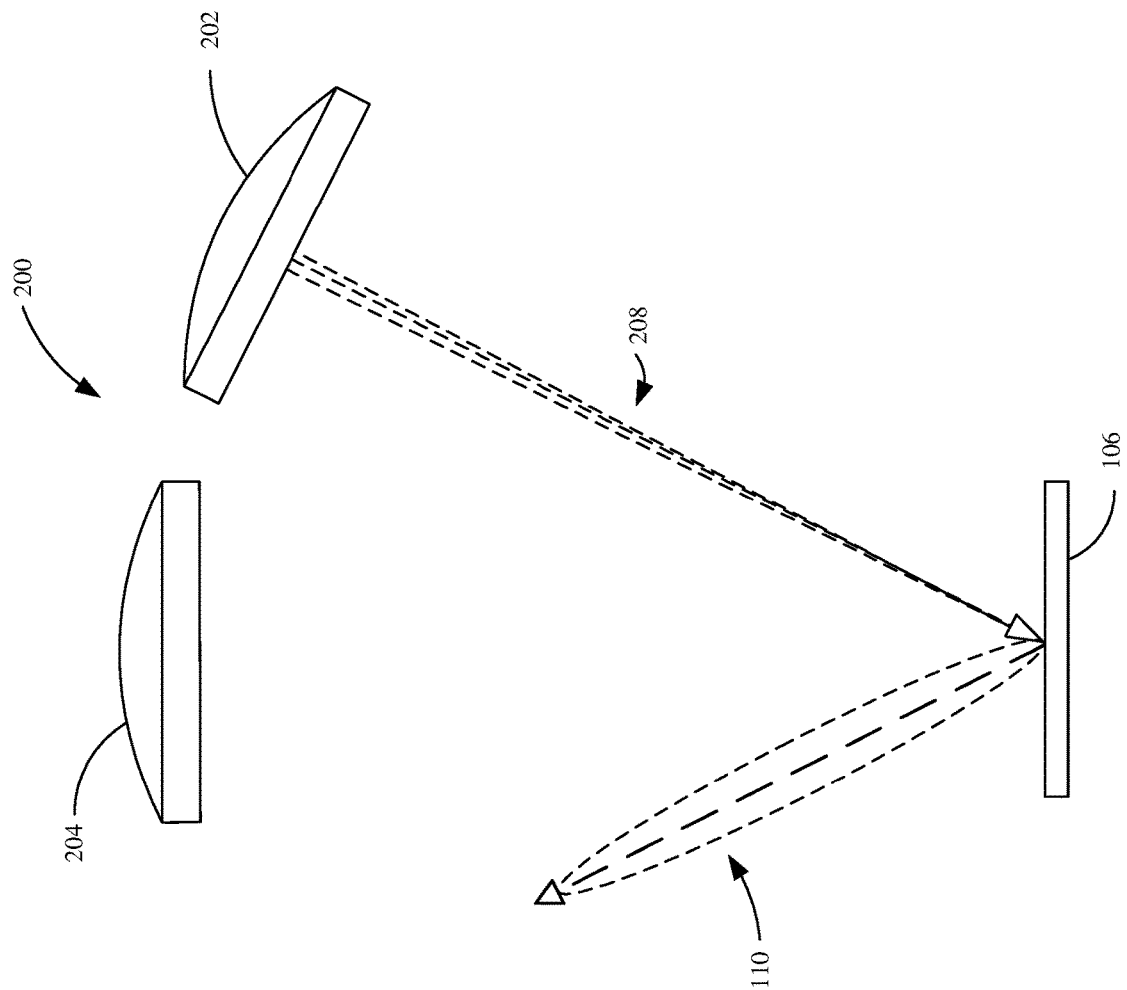
FIG. 5 is a diagrammatic view showing one example of an optical profilometry system in accordance with the prior art.

FIG. 5 is a diagrammatic view showing one example of an optical profilometry system in accordance with the prior art. System 200 includes illumination source 202, imaging system 204, target 106, illumination 208, and reflection 110. System 200 is shown in the same configuration as FIGS. 3 and 4. Target 106 is a specular target (e.g a silicon chip). Illumination 208 is projected onto target 106 by illumination source 202. Reflection 110 is reflected from target 106 but is not captured by imaging system 204. Because target 106 is a specular target, the incident light from illumination source 202 is reflected from target 106 in a direction defined by the incidence angle of illumination source 202 relative to target 106. Thus, reflection 110 is a specular reflection. That is, the incident light (e.g. illumination 208) is reflected in a single outgoing direction, as represented by illumination 110. Because of this, the configuration of system 200 is unable to capture reflection 110 and thus no dimensional information relative to target 106 is obtained by imaging system 204.

Figure 6:
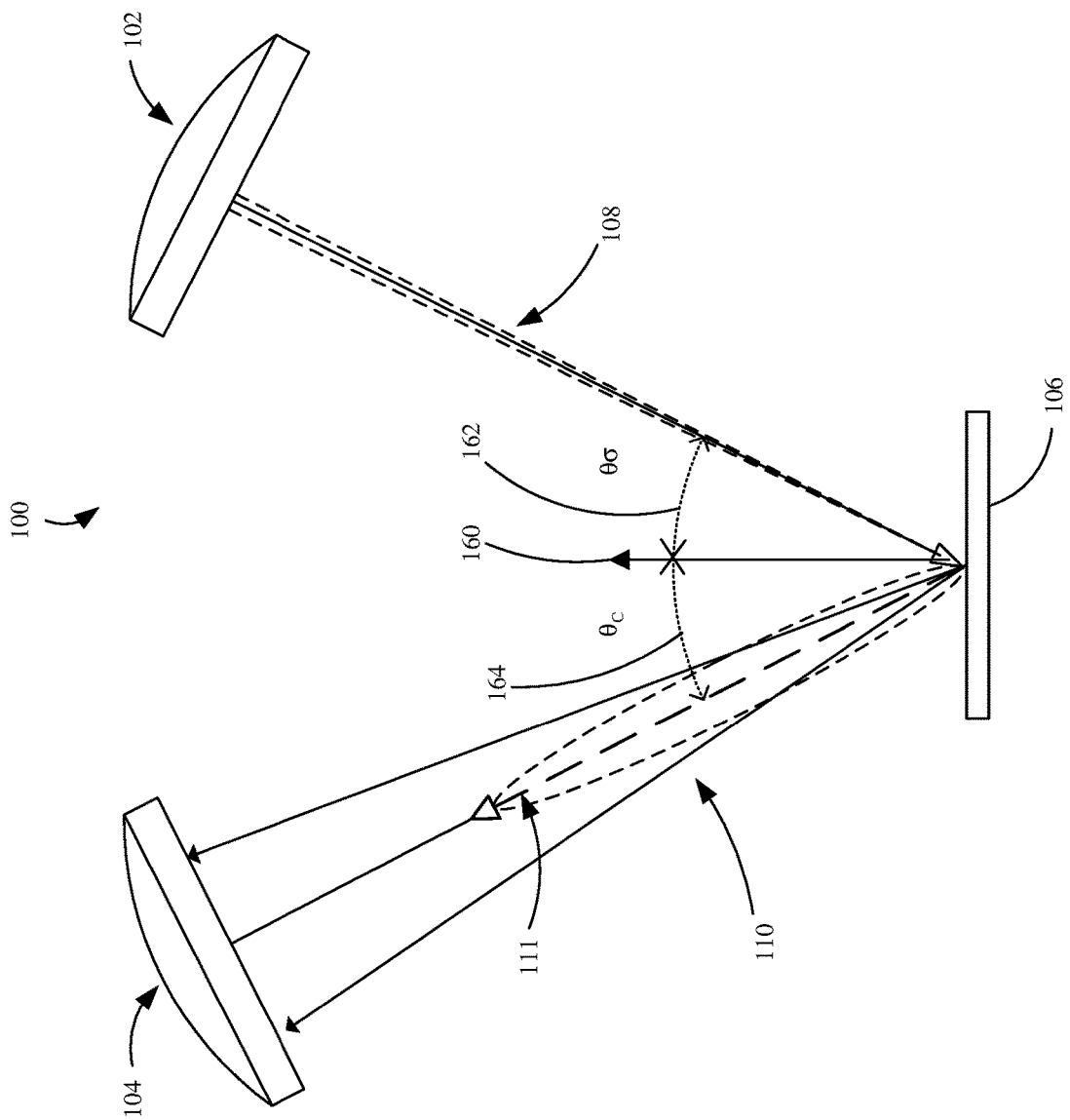
FIG. 6 is a diagrammatic view showing one example of an optical profilometry system in accordance with an embodiment of the present invention.

FIG. 6 is a diagrammatic view showing one example of an optical profilometry system in accordance with an embodiment of the present invention. System 100 includes illumination source 102, imaging system 104, target 106, illumination 108, reflection 110, chief ray 111, normal surface vector 160, angle of incidence 162, and angle of reflectance 164. System 100 is similar to system 100 in FIG. 1. Imaging system 104 is configured relative to target 106 and illumination source 102 such that the view angle of imaging system 104 is aligned with the specular reflection (e.g. reflection 110) of the incident light (e.g. illumination 108) projected onto target 106 by illumination source 102. In this configuration, imaging system 104 will capture specular reflection (e.g. 110) from a specular target (e.g. 106) such that dimensional information relative to target 106 may be obtained. Chief ray 111 represents that ray pathway towards the center of imaging system 104. Normal surface vector 160 (also called the normal line in the law of reflection) depicts a line drawn perpendicular to the surface of target 106 at the point of incidence (i.e. where illumination 108 strikes target 106) such that the angle between illumination 108 and reflection 110 are split in equal halves, as represented by angle of incidence 162 and angle of reflectance 164. But because target 106 is a specular target, reflection 110 is reflected from target 106 in a direction defined by the angle of incidence 162. Thus, in order to capture reflection 110, imaging system 104 is aligned with the angle of reflectance 164.

Figure 7:
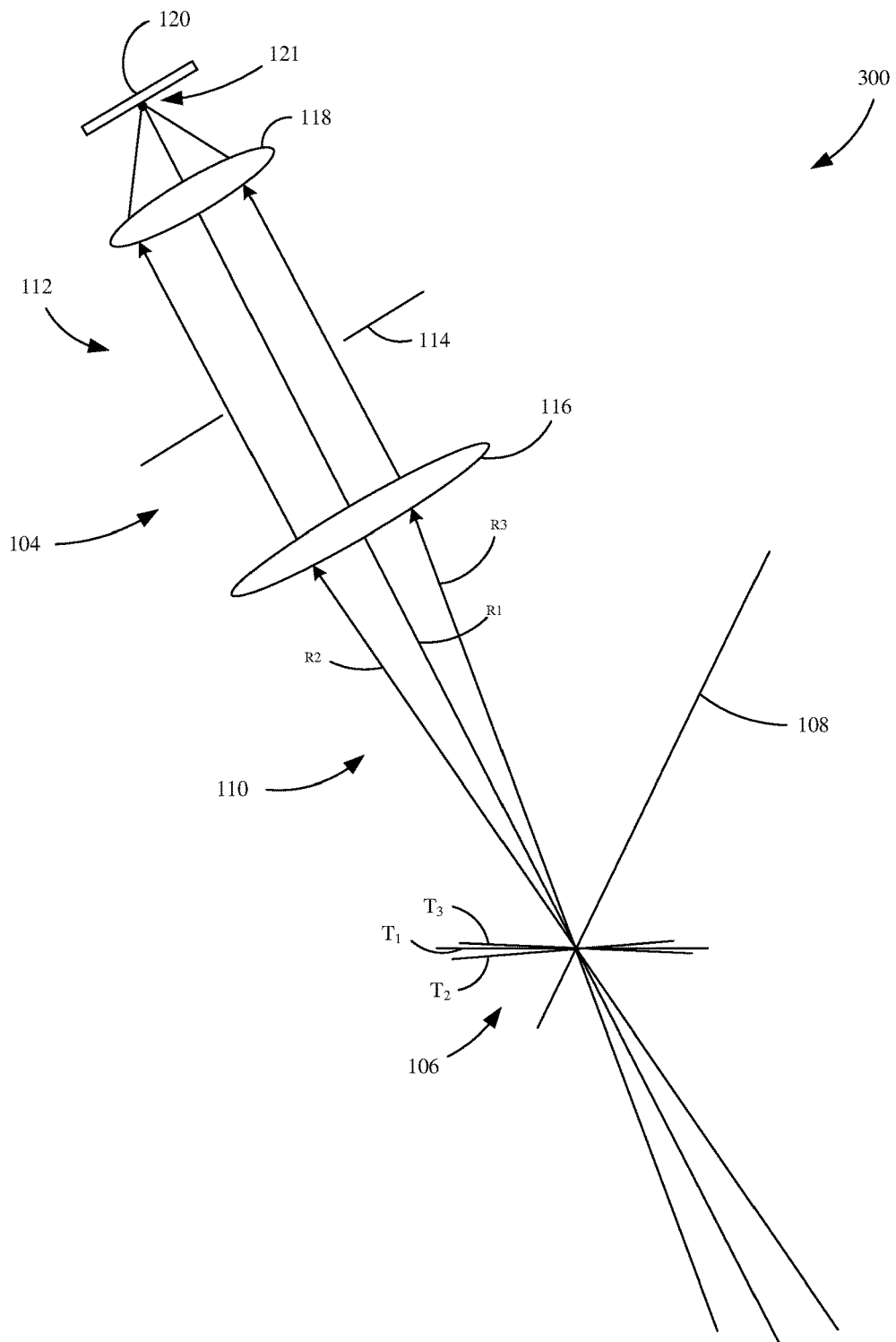
FIG. 7 is a diagrammatic view showing one example of an optical profilometry system.

FIG. 7 is a diagrammatic view showing one example of an optical profilometry system. System 300 is similar to system 100 except that it shows target 106 at various tilt angles. System 300 includes imaging system 104, target 106, illumination 108, reflection(s) 110, lens assembly 112, aperture 114, first lens 116, second lens 118, image sensor 120, and reception point 121. Illumination 108 is projected onto target 106 by an illumination source (e.g. source 102) which is reflected off of target 106 towards imaging system 104. Reflection 110 passes through first lens 116, aperture 114 and second lens 118 (i.e. lens assembly 112) towards image sensor 120. As shown, target 106 comprises a specular target, as can be seen from the specular nature of reflection 110. Lens assembly 112 comprises a telecentric lens assembly as can be seen by the substantially parallel nature of the ray bundle as it passes through first lens 116 towards second lens 118.

System 300 is obtaining dimensional information relative to target 106, which is shown at best focus height. As mentioned above, depending on a target's tilt, the reflection ray bundle will enter the lens assembly at different points. At tilt position T1, target 106 is at a substantially horizontal angle (i.e. ideal best focus plane or ideal flat focus). At position T1 illumination 108 is reflected from target 106 towards lens assembly 112 at its center as represented by reflection position R1 resulting in a correct measurement of target 106's height. At tilt position T2, target 106 is titled towards the left (counter-clockwise) relative to T1. At tilt position T2 illumination 108 is reflected from target 106 towards lens assembly 112 off-axis as represented by reflection position R2. At tilt position T3, target 106 is tilted towards the right (clockwise) relative to T1. At tilt position T3 illumination 108 is reflected from target 106 towards lens assembly 112 off-axis as represented by reflection position R3. However, because reflection 110 (as represented by R2 and R3) is still captured by imaging system 104 and image to the same point on image sensor 120 (i.e. reception point 121), albeit off-axis, the height readings will be seen as the same as the height reading for T1 (as represented by R1).

As depicted above, a level target will cause the reflection to enter the lens assembly at its center whereas a tilted target will cause the reflection to enter the lens assembly off-axis. A tilt too much in any direction will cause the reflection (or a portion of it) to miss the lens assembly and thus not be captured by imaging system 104 which will result in inaccurate dimensional information. For a system with an illumination source numerical aperture smaller than the numerical aperture of the imaging system, the maximum target tilt should be constrained to be less than:

$$\tfrac{1}{2}(NA_{Camera} - NA_{Source}) \qquad \text{Equation 1}$$

For a system with an illumination source numerical operation larger than the numerical aperture of the imaging system, the maximum target tilt should be constrained to be less than the negative of Equation 1.

Problems also occur if the target is moved away from the imaging system's focus position, even if by a small amount, since, with a specular target, the measured phase is a function of both target tilt and target height.

Figure 8:
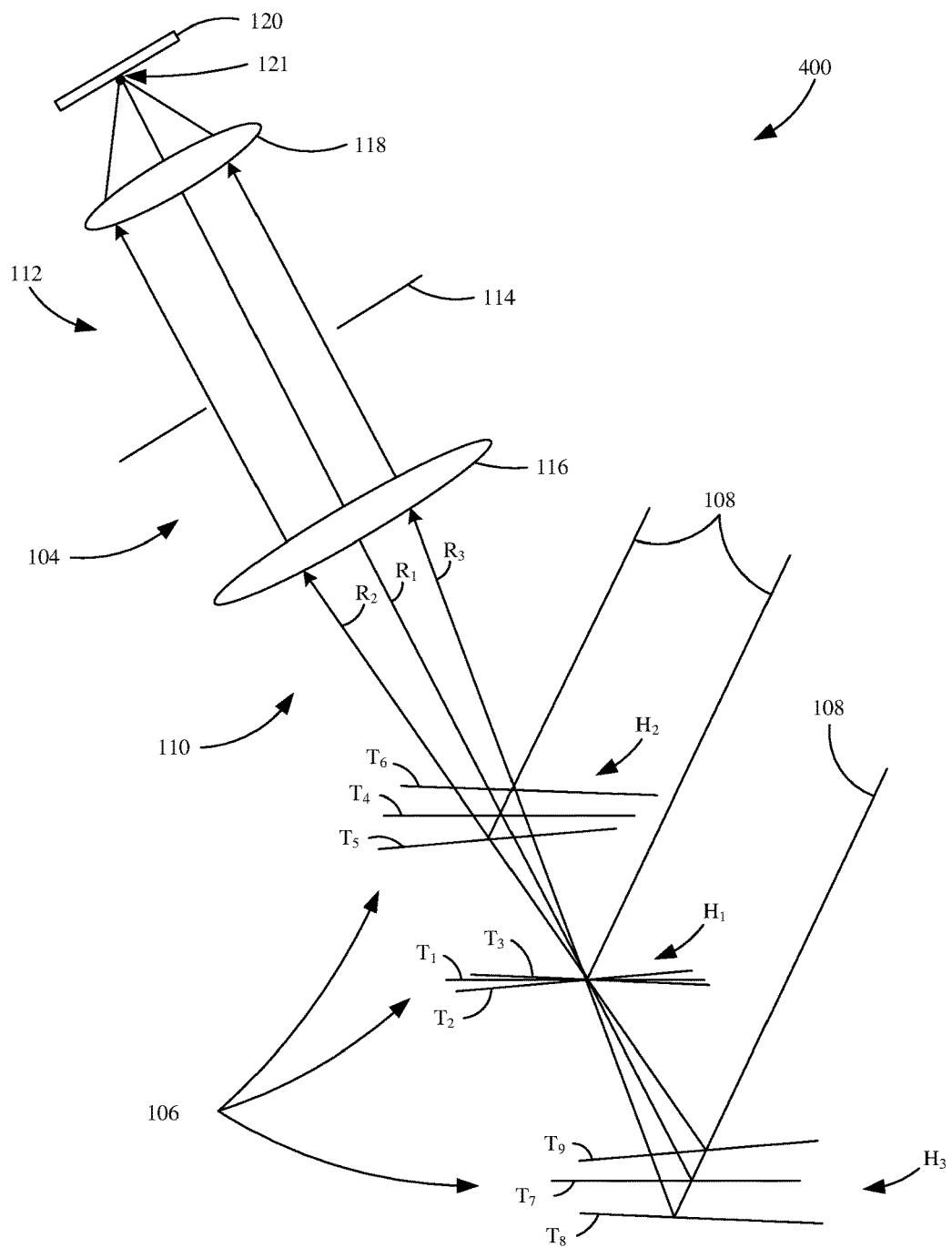
FIG. 8 is a diagrammatic view showing one example of an optical profilometry system.

FIG. 8 is a diagrammatic view showing one example of an optical profilometry system. System 400 is similar to system 300 except that it shows target 106 at various heights. System 400 includes imaging system 104, target(s) 106, illumination(s) 108, reflection(s) 110, lens assembly 112, aperture 114, first lens 116, second lens 118, image sensor 120, and reception point 121. Illumination 108 is projected onto target 106 by an illumination source (e.g. source 102) which is reflected off of target 106 towards imaging system 104. Reflection 110 passes through first lens 116, aperture 114 and second lens 118 (i.e. lens assembly 112) towards image sensor 120. As shown, target 106 comprises a specular target, as can be seen from the specular nature of reflection 110. Lens assembly 112 comprises a telecentric lens assembly as can be seen by the substantially parallel nature of the ray bundle as it passes through first lens 116 towards second lens 118.

Height position H1 is similar to the position of target 106 in FIG. 7, with tilt position T1 representing illumination source 104's ideal best focus plane. At height position H2 target 106 is positioned above the ideal best focus plane. At tilt position T4, target 106 is at a substantially horizontal angle. At tilt position T4, illumination 108 is reflected from target 106 towards lens assembly 112 at its center as represented by reflection position R1 resulting in a correct measurement of target 106's height. At tilt position T5, target 106 is tilted towards the left (counter-clockwise) relative to T4. At tilt position T5 illumination 108 is reflected from target 106 towards lens assembly 112 off-axis as represented by reflection position R2 resulting in an incorrect measurement of target 106's height. At tilt position T6, target 106 is tilted towards the right (clockwise) relative to T4. At tilt position T6 illumination 108 is reflected from target 106 towards lens assembly 112 off-axis as represented by reflection position R3 resulting in an incorrect measurement of target 106's height.

At height position H3 target 106 is positioned below the ideal best focus plane. At tilt position T7, target 106 is at a substantially horizontal angle (i.e. ideal best focus plane or ideal flat focus). At tilt position T7 illumination 108 is reflected from target 106 towards lens assembly 112 at its center as represented by reflection position R1 resulting in a correct measurement of target 106's height. At tilt position T8, target 106 is tilted towards the right (clockwise) relative to T7. At tilt position T8 illumination 108 is reflected from target 106 towards lens assembly 112 off-axis as represented by reflection position R2 resulting in an incorrect measurement of target 106's height. At tilt position T9, target 106 is tilted towards the left (counter-clockwise) relative to T7. At tilt position T9 illumination 108 is reflected from target 106 towards lens assembly 112 off-axis as represented by reflection position R3 resulting in an incorrect measurement of target 106's height.

Above best focus, a target tilted in a clockwise direction will measure higher than its actual height position. A target tilted in a counter-clockwise will measure lower than its actual height position. As the target moves further from the imaging system's best focus position the error sensitivity of height measurement to tilt angle increases. The sign of the error also flips as the target goes from above to below the target's best focus plane, as can be seen by a comparison of T6 to T8 and T5 to T9. T6 and T8 are both tilted clockwise, and both have an equivalent angle of reflectance. Illumination 108 is reflected from both towards lens assembly 112 off-axis. However, at T6 (above target's best focus plane, e.g. T1) reflection 110 is located on the right side of the ray bundle as it is initially reflected from target 106, as represented by R3. Whereas with T8 (below the target's best focus plane, e.g. T1), reflection 110 is located on the left side of the ray bundle as it is initially reflected from target 106, as represented by R2. Similarly, with comparison of T5 to T9, both are tilted counter-clockwise, and both have an equivalent angle of reflectance. Illumination 108 is reflected from both towards lens assembly 112 off-axis. However, at T5 (above the target's best focus plane, e.g. T1) reflection 110 is located on the left side of the ray bundle as it is initially reflected from target 106, as represented by R2. Whereas with T9 (below the target's best focus plane, e.g. T1), reflection 110 is located on the right side of the ray bundle as it is initially reflected from target 106, as represented by R3.

The sensitivity of measured height to target tilt angle can be thought of as a change in the system's triangulation angle. Targets tilted clockwise effectively have a smaller triangulation angle the normal (ideal) system triangulation angle. Targets tilted counter-clockwise effectively have a larger triangulation angle than the normal (ideal) system triangulation angle.

The tilting depicted in FIGS. 7 and 8 causes a problem with obtaining accurate dimensional information relative to target 106. For example, even though T6 and T5 are at different heights than T4, because reflection 110 (as represented by R3 and R2 respectively) is still captured by imaging system 104, and image to the same point on image sensor 120 (i.e. at reception point 121), albeit off-axis, the height readings will be seen as the same as the height reading for T4. Similarly, with T9 and T8, even though they are at different heights than T7, because reflection 110 (as represented by R2 and R3 respectively) is still captured by imaging system 104, albeit off-axis, the height readings will be seen as the same as the height reading for T7. This causes the optical phase profilometry system (e.g. 100, 300 and 400) to read targets at different heights and different tilts (e.g. T5, T6, T8, and T9) as having substantially the same position as targets with different heights and tilts (e.g. T4 and T7).

Figure 9:
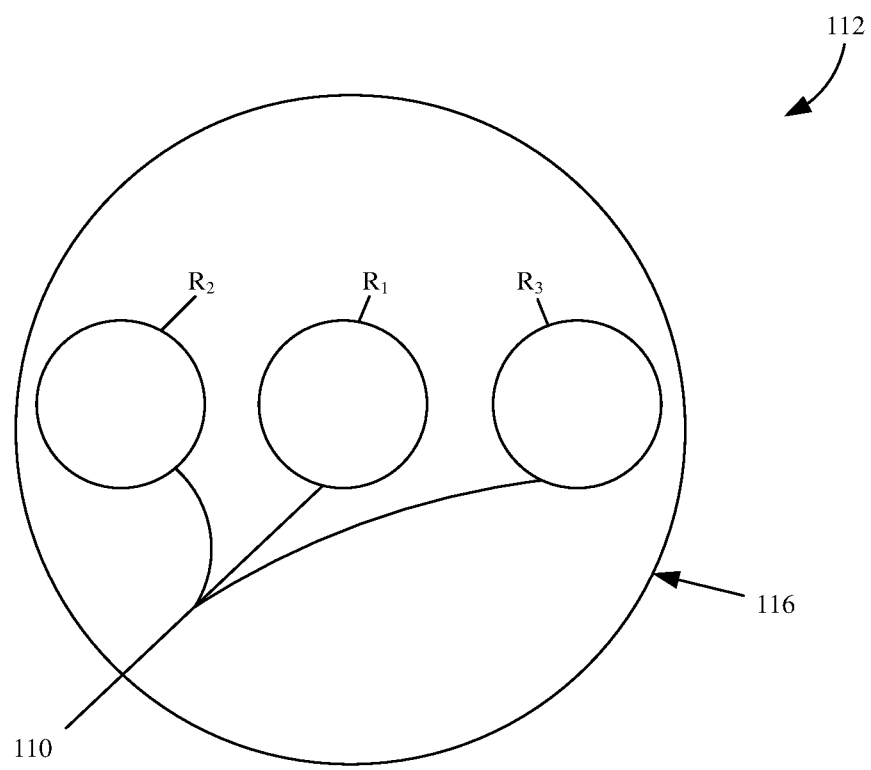
FIG. 9 is a bottom view showing one example of an imaging system lens assembly.

FIG. 9 is a bottom view showing one example of an imaging system lens assembly. Lens assembly 112 includes reflection(s) 110 and first lens 116. As explained above, the target tilt causes reflection(s) 110's ray bundle to enter lens assembly 112 at different points. For a target with a substantially horizontal angle (e.g. T1, T4 or T7), reflection 110 will enter lens assembly 112 at its center represented by reflection position R1 resulting in a correct measurement of the target's height. For a target with a counter-clockwise tilt (e.g. T2, T5 or T9), reflection 110 will enter lens assembly 112 off-axis as represented by reflection position R2 resulting in an incorrect measurement of the target's height. For a target with a clockwise tilt (e.g. T3, T6 or T8), reflection will enter lens assembly 112 off-axis as represented by reflection position R3 resulting in an incorrect measurement of the target's height.

The sensitivity of measured height to target tilt angle can be thought of as a change in the system's triangulation angle. Targets tilted clockwise effectively have a smaller triangulation angle than the normal (i.e. ideal best focus) system triangulation angle. Targets tilted counter-clockwise effectively have a larger triangulation angle than the normal (i.e. ideal best focus) system triangulation angle.

As mentioned above, the derived height of a specular target is sensitive to the illumination of the pupils, and this problem becomes especially critical if the specular target is tilted. It can cause a variety of problems, for example, but not limited to, obtaining inaccurate dimensional information relative to the target, or vignetting of the captured image. To better understand the nature of the problem, consider an idealized 2-D profilometer with telecentric optics and unit magnifications everywhere, as depicted in the Figure below.

Figure 10:
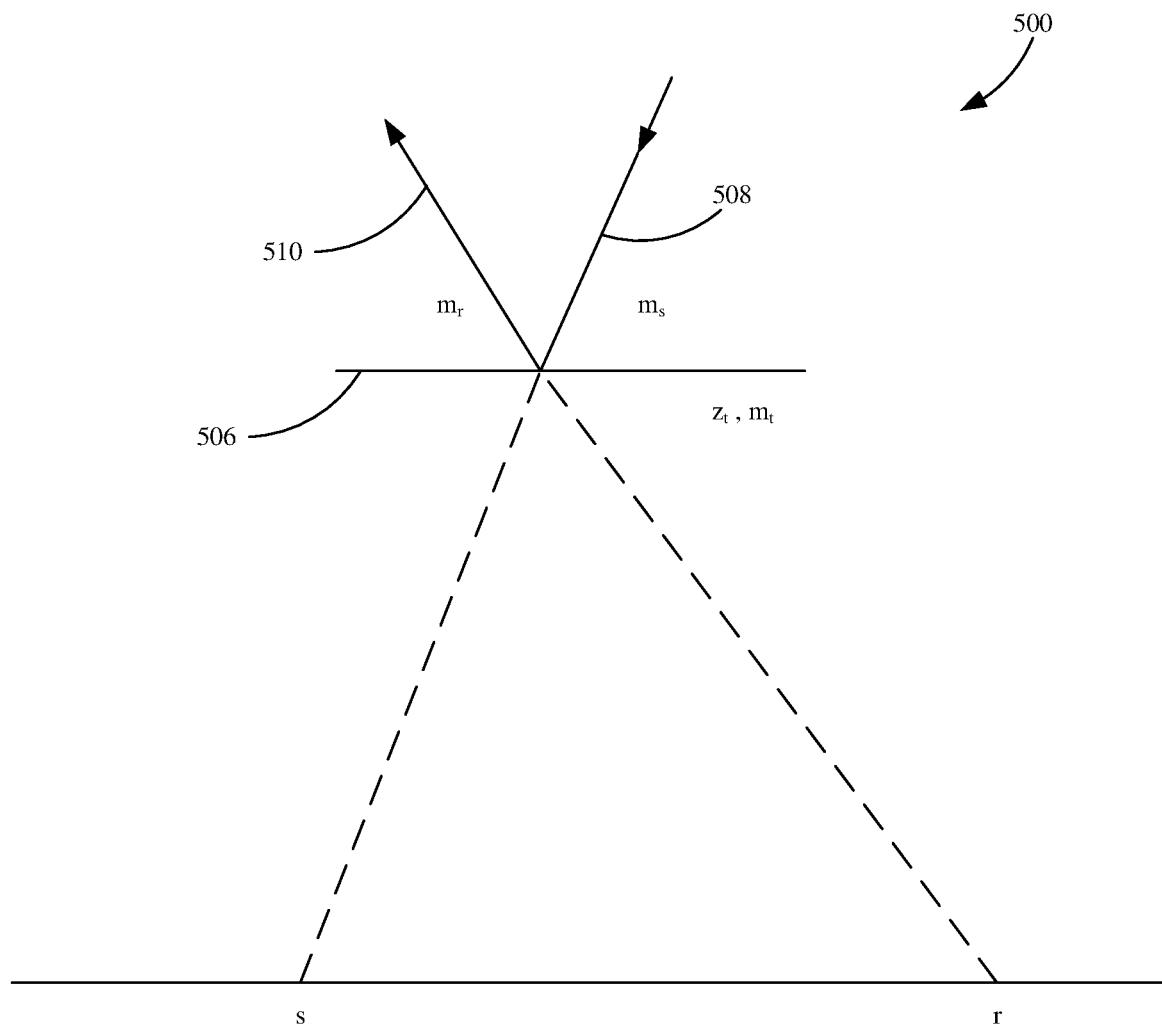
FIG. 10 is a diagrammatic view showing one example of an optical profilometry system.

FIG. 10 is a diagrammatic view showing one example of an optical profilometry system. System 500 includes specular target 506, illumination 508, and reflection 510. Illumination 508 is projected from an illumination source (not shown) with a slope, $m_s$, corresponding to the chosen triangulation angle (e.g. angle of incidence 162). Illumination 508 falls on specular target 506, where specular target 506 has the slope $m_t$. Illumination 508 then reflects, as reflection 510, in the direction $m_r$, towards an imaging system (not shown). For the purposes of this depiction, both the illumination source and the imaging system are focused at $z_t$. By this, it is meant that the illumination source's projected ray bundle (e.g. illumination 508) originating from a specified point on the illumination source's pupil converge to a common point at $z_t$, and that the ray bundle reflected from specular target 506 (e.g. reflection 510) emanating from a specified target point at $z_t$ converge to a common point on the imaging system's pupil. Thus, there is a one-to-one correspondence between the location on the illumination source's pupil or the imaging system's pupil and the location where such a ray intercepts the x axis.

Additionally, for the purposes of this depiction, the imaging system does not vignette any of the reflection ray bundle. Thus, the centroid of the bundle of rays coincides with the chief ray, that is the ray at the center of the imaging system's pupil. In this way, the derivation can be simplified (for purposes of illustration) by tracing only the chief ray.

The illumination source ray (e.g. illumination 508) has the equation:

$$x = s + m_s z \quad \text{Equation 2}$$

and the imaging system ray (e.g. reflection 510) has the equation:

$$z = r - m_r z \quad \text{Equation 3}$$

With these definitions, the imaging system ray angle is twice the target angle plus the illumination source angle. In analytic geometry terms, we have the equation:

$$\begin{bmatrix} w \\ w m_r \end{bmatrix} = \begin{bmatrix} 1 & -m_t \\ m_t & 1 \end{bmatrix}^2 \begin{bmatrix} 1 \\ m_s \end{bmatrix} \quad \text{Equation 4}$$

where w is a homogenous weight. Evaluating this, we have $$m_r = \frac{2 m_t + m_s (1 - m_t^2)}{1 - 2 m_s m_t - m_t^2} \quad \text{Equation 5}$$

From the geometry depicted in FIG. 10, it is clear that $$r - s = z_t (m_s + m_r) \quad \text{Equation 6}$$

and therefore $$r - s = 2 z_t \frac{(1 - m_s m_t)(m_s + m_t)}{1 - 2 m_s m_t - m_t^2} \quad \text{Equation 7}$$

It is useful to expand Equation 7 in a Taylor series where $$r - s = 2 z_t (m_s + (1 + m_s^2) m_t) + O(m_t^2) \quad \text{Equation 8}$$

In practice, we observe r–s and wish to derive $z_t$. The result of Equation 8, r–s, is the observed shift of the structured light pattern as seen by the camera system. Equation 8 shows the dependence of the reconstructed height $z_t$ on target slope $m_t$. For an arbitrary target, Equation 8 generalizes to a nonlinear differential equation as follows:

$$r - s = 2 z (m_s + (1 + m_s^2) \dot{z}) + O((\dot{z})^2) \quad \text{Equation 9}$$

Equation 9 must be solved in order to compute the target profile z. It is a significant complication that an optical phase profilometer imaging a specular target must also act as a deflectometer, if an accurate target profile is to be computed, because of the nature of specular reflection.

Traditional phase profilometry systems used to measure diffuse targets are calibrated to correct for geometric distortion of the imaging system lens assembly and the illumination source lens assembly. As shown above, the specular phase profilometer system is sensitive to the imaging system's focus position (relative to the target) and the received ray angles of the reflection ray bundle. The specular phase profilometer system is also sensitive to additional lens aberrations. Such additional aberrations include, but are not limited to, field curvature and spherical aberration. For the purpose of illustration, but not by limitation, the method of correction for lens aberrations described below considers field curvature and spherical aberration but may also be used to correct for other lens characteristics. The description of the method begins first with a discussion of the two types of lens aberrations.

Field curvature is a change in focus position across an imaging system's field of view. Instead of the best focus being on a flat and level plane the best focus height is a surface which tips and curves across a field. The aberration of field curvature is depicted below.

Figure 11A:
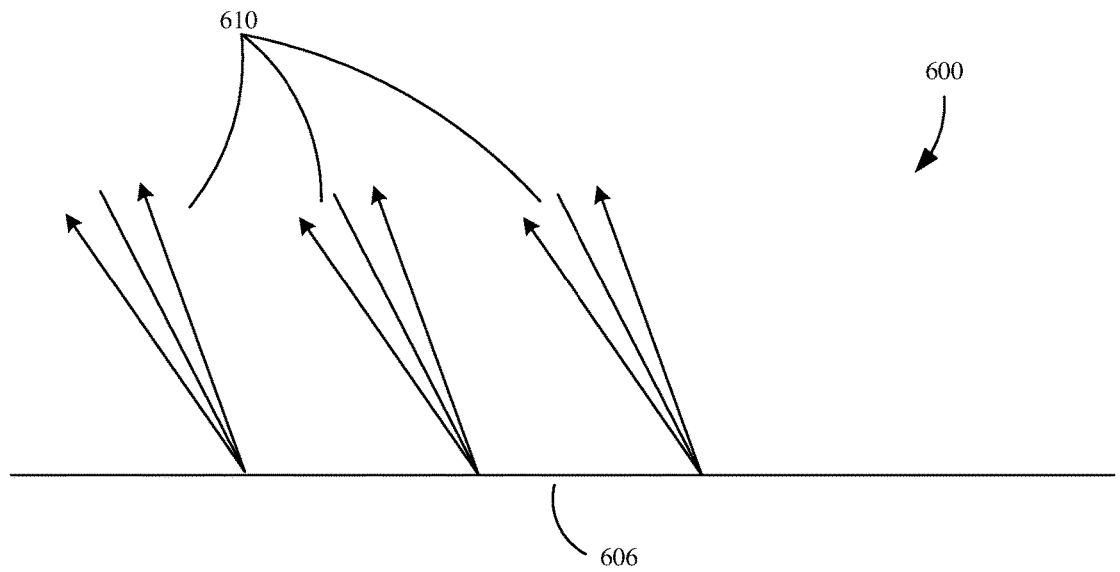
FIG. 11A is a diagrammatic view showing one example of a non-ideal focus environment.

FIG. 11A is a diagrammatic view showing one example of an ideal flat focus environment. Environment 600 includes focus plane 606 and reflection(s) 610. In an ideal flat focus environment, like environment 600, the ideal imaging system focuses to a flat and level focus plane, like focus plane 606. However, in a real environment, the imaging system does not focus the same way it would in an ideal environment.

Figure 11B:
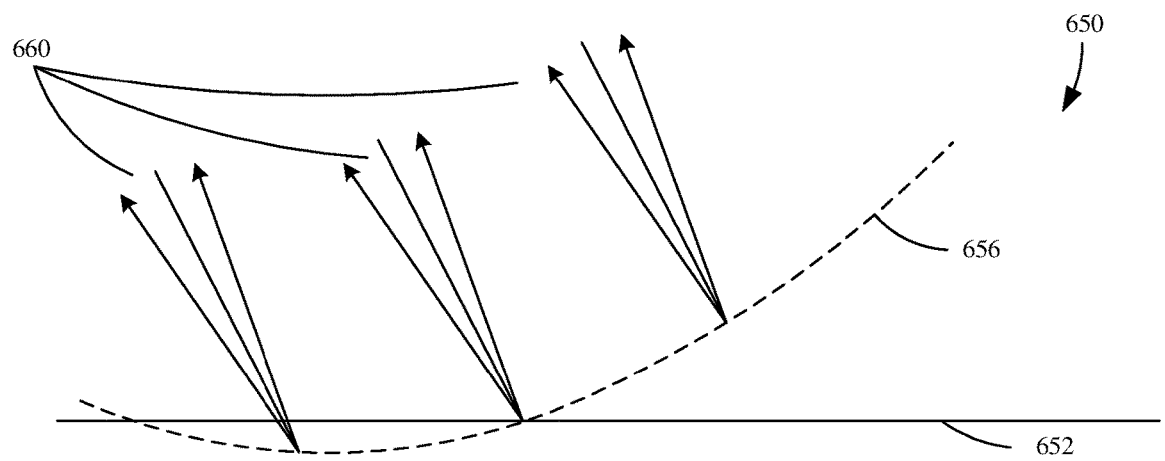
FIG. 11B is a diagrammatic view showing one example of a non-ideal focus environment.

FIG. 11B is a diagrammatic view showing one example of a non-ideal focus environment. Environment 650 includes ideal focus plane 652, non-ideal focus plane 656, and reflection(s) 660. In a non-ideal focus environment, like environment 650, a target cannot be brought into focus on flat image plane (e.g. ideal focus plane 652). In such an environment, ray bundles (e.g. reflection(s) 660) near the optical axis (i.e. center point of the lens) will be in focus at an ideal focus plane, as can be seen with the middle ray bundle which has a focus plane height consistent with ideal focus plane 652. However, for off-axis ray bundles, like the left and right ray bundles in the Figure, the focus position is shifted away from ideal focus plane 652, as can be seen by non-ideal focus plane 656. This aberration can cause image distortions, such as, but not limited to, blurring, haziness, an appearance of the image being out of focus, etc.

Spherical aberration causes a shift in focus position with ray angle. Marginal rays focus at a different height than paraxial rays. For a typical lens with positive spherical aberration, the marginal rays will focus nearer the lens than the paraxial rays. Spherical aberration is depicted in the Figures below.

Figure 12A:
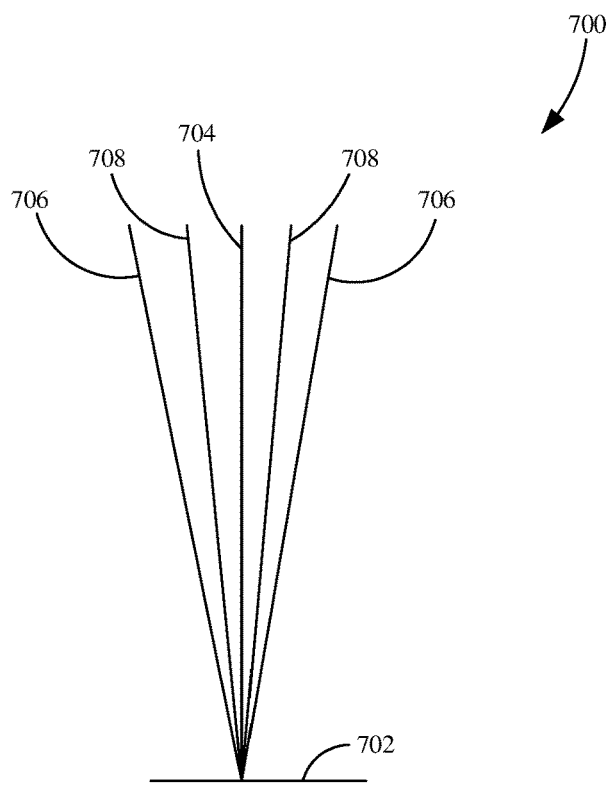
FIG. 12A is a diagrammatic view showing one example of an ideal lens focus plane environment.

FIG. 12A is a diagrammatic view showing one example of an ideal lens focus plane environment. Environment 700 depicts an ideal lens focus plane without any spherical aberration. Environment 700 includes focus plane 702, principle axis 704, marginal ray(s) 706, and paraxial ray(s) 708. Principle axis 704 depicts the center of the lens (not shown). As can be seen in environment 700, with an ideal lens, having no spherical aberration, both marginal ray(s) 706 and paraxial ray(s) 708 focus at the same position.

Figure 12B:
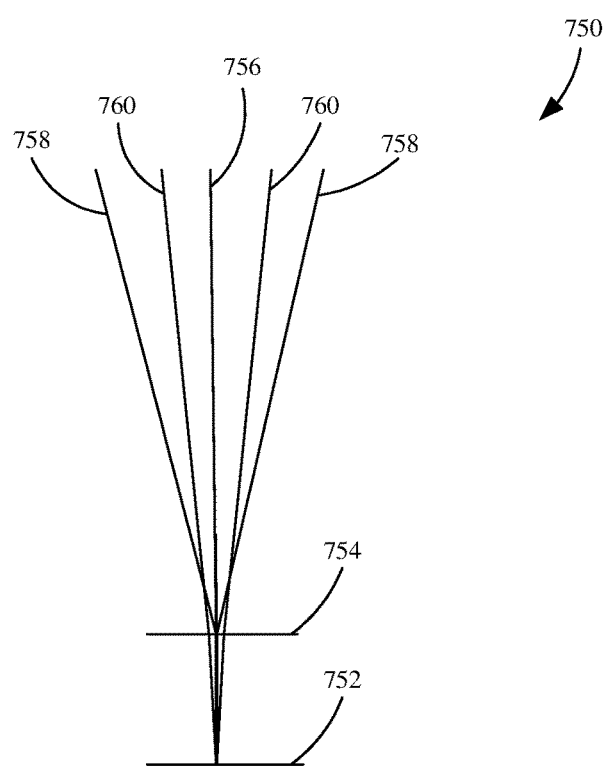
FIG. 12B is a diagrammatic view showing one example of a non-ideal lens focus plane environment.

FIG. 12B is a diagrammatic view showing one example of a non-ideal lens focus plane environment. Environment 750 depicts the focus plane of a lens with spherical aberration, specifically, a typical lens with positive spherical aberration. Environment 750 includes paraxial focus plane 752, marginal focus plane 754, principle axis 756, marginal ray(s) 758, and paraxial ray(s) 760. Principle axis 756 depicts the center of the lens (not shown). As can be seen in environment 750, a lens with spherical aberration causes a shift in focus position. Marginal focus plane 754 is nearer the lens assembly as compared to paraxial focus plane 752. This shift in focus position relative to each set of rays can cause anomalies in the captured image of the target. For example, but not limited to, blurring, haziness, an appearance of the image being out of focus, etc.

To obtain accurate dimensional information relative to various targets of optical profilometry systems, lens aberrations, such as those described above, and other forms of lens aberrations must be corrected for. One embodiment proved to have a variation with target gradient that was not predicted by Equation 9. In this embodiment, the imaging system lens was designed to have a controlled amount of spherical aberration in order to suppress aliasing effects. In this embodiment, as the target was tilted, the return light (i.e. the reflection) swept out of the pupil of the imaging system lens. Because of the spherical aberration, the centroid was perturbed by a cubic term in the target gradient. However, it is possible to apply post-compensation to at least partially correct this problem, thus improving the accuracy of the height measurement. Introducing azimuth vector $$v \equiv \begin{bmatrix} \cos \lambda \\ \sin \lambda \end{bmatrix} \quad \text{Equation 10}$$

where the azimuth of the imaging system is $\lambda$, we expect z errors of the form $$\Delta z = c(v \cdot \nabla z)^3 \quad \text{Equation 11}$$

where $c$ is some constant and $$v \cdot \nabla z \quad \text{Equation 12}$$

is the derivative of z in direction v.

In practice it was found that noise in computing the gradient, equation 12 had a very detrimental effect on the calculation. Some lowpass filtering was essential. At first the corrected image was computed from $$L = LPF(r-s) \quad \text{Equation 13}$$

and the $(r-s)$ corrected $$(r-s)\text{corrected} = L + P3(\alpha, \beta, v \cdot \nabla L) \quad \text{Equation 14}$$

where r–s is the uncorrected geometric displacement and $P_3( )$ is a trivariate polynomial of degree 3 that describes the effect that the optical aberrations have on the detected position shift r–s:

$$P_3(\alpha, \beta, v \cdot \nabla L(\alpha, \beta)) \equiv \sum_i \sum_j \sum_k c_{ijk} T_k(v \cdot \nabla L(\alpha, \beta)) B_j(\alpha) \beta_i(\beta) \quad \text{Equation 15}$$

This calculation was convenient but the lowpass filtering degraded the sharpness of the final image. To avoid this problem, a modified code was devised where the lowpass filtering only affects the computation of the correction:

$$r-s+P_3(\alpha,\beta,LPF(v \cdot \nabla \Phi)) \quad \text{Equation 16}$$

An important application for an optical profilometry system imaging a specular target is the measurement of integrated passive devices. Integrated passive devices are small, rectangular components with specular tops. Because of the noise incurred with estimates derived from gradients, and the smoothness (i.e. specular nature) of the integrated passive device top surface, it is desirable to model the integrated passive device by a bivariate polynomial. In such a case, one can model both the spherical aberration and deflectometric corrections as functions of the true target gradient of z. Thus, Equation 9 becomes:

$$\Phi = 2z(m_s + (1+m_s^2)(v \cdot \nabla z)) - P_3(\alpha, \beta, (v \cdot \nabla z)) + O((v \cdot \nabla z)^2) \quad \text{Equation 17}$$

with the spherical aberration correction corresponding to the trivariate polynomial in Equation 14.

The role of calibration is vital to optical profilometry systems, particularly those imaging specular targets. It is desirable to set up the calibration equations as a linear system. The objection might be raised that one must somehow invert Equation 17 to obtain a reconstruction algorithm, but by choosing an explicit (non-iterative) correction model, it is possible to force the linear least-squares fit in the calibration routine to handle all the inversions such that the runtime correction can be a single, explicit formula:

$$p = \Phi(s_0 + s_1)(v \cdot \nabla \Phi)) + P(\alpha, \beta, v \cdot \nabla \Phi) \quad \text{Equation 18}$$

In this single, explicit formula, P( ) is a trivariate polynomial in its arguments of pixel coordinates and directional derivative. The first term handles the specular reconstruction, and the second term handles the spherical aberration correction.

Along with the lens aberrations mentioned above, another non-ideality that can affect obtaining accurate dimensional information relative to a target is pupil vignetting effects. In any practical optical profilometry system, the illumination source has a numerical aperture that defines the boundary of the ray bundle emerging from each point on the target. Normally, the system would be aligned such that, for a non-tilted target, the center of the illumination source pupil would intersect the center of the imaging system pupil. However, as described above, any tilt of the target disturbs this alignment.

Additionally, the imaging system has its own numerical aperture. If the two numerical apertures are comparable, one can have a situation where the apertures partially overlap. Thus, an aperture can restrict the cross-section of the ray bundle, in a phenomenon known as vignetting. This complicates the image reconstruction since the basic geometry of optical profilometry, as described above in FIGS. 8 and 10, assumes that the centroid of the ray bundle is deviated by exactly twice the target tilt. With vignetting, however, the centroid of the ray bundle, and thus the effective triangulation angle, is a more complicated function of the tilt. In principle, this deviation from ideality (i.e. the geometry assumed as described in FIGS. 8 and 10) could be calibrated and compensated for. However, because the edges of the two aperture functions are sharp, the calibration curves will have slope discontinuities. Such discontinuities prevent the usual multivariate polynomials fitting well.

In one embodiment, to avoid such problems, one pupil must completely enclose the other (i.e. either the imaging system's pupil completely encloses the illumination source's pupil or vice versa). In one embodiment, the illumination source's numerical aperture is smaller than the imaging system's numerical aperture. In another embodiment, the illumination source's numerical aperture is larger than the imaging system's numerical aperture. In another embodiment, the illumination source's numerical aperture and the imaging system's numerical aperture are equivalent.

There are also difficulties associated with solving for equation 9 to derive the profile z. One such problem is that if small features are to be measured (as is often the case in applications of optical profilometry systems), the baseline for estimating the target gradient is small. Because of this, small errors in the detected phase (z height position) can give rise to large errors in the gradient, which, through Equation 9, can greatly perturb the reconstructed profile. In numerical-analysis terms, the problem is ill-conditioned. In other words, small errors in the input data lead to large errors in the reconstruction.

One way to avoid this problem is to observe the target with multiple illumination source-imaging system pairs. As described above, an optical phase profilometry system using only one illumination source-imaging system pair is fully contemplated by the present invention. Additionally, an optical phase profilometry system using multiple illumination source-imaging system pairs is also fully contemplated by the present invention. Each system may obtain accurate dimensional information relative to a target, but each system provides unique advantages. For the single pair system, for instance, accurate dimensional information can be obtained (utilizing the techniques and methods described above) more efficiently and in a more cost-effective manner. By only using a single pair, installation is easier, manufacturing and maintenance is less expensive along with other benefits. For certain targets (e.g. a target with components having varying height dimensions that can cast shadows on the image), using multiple pairs can be advantageous by, for instance, observing the target from multiple perspectives (thereby reducing the problems with associated with shadows).

In a system observing a target with multiple illumination source-imaging system pairs, using an arbitrary azimuth, Equation 9 for the kth pair becomes:

$$(r-s)_k = 2z(m_s + (1+m_s^2)(v_k \cdot \nabla z))$$ Equation 19 where $v=[\cos \varphi, \sin \varphi]$. The troublesome slope term noted above is, in Equation 19, dotted with the azimuth vector $v_k$. If there are multiple azimuths it is possible to form a weighted sum such that the gradient term cancels for any gradient:

$$\Sigma w_k (r-s)_k = 2zm_s \Sigma w_k$$ Equation 20

Without the gradient term, the reconstruction is greatly simplified. The desirable cancellation occurs when $$\Sigma w_k v_k = 0$$ Equation 21 or $w^T V = 0$. This is a null-subspace problem, which has a non-trivial solution if V is not of full row rank. For illustrative purposes, the problem will be explained for a system using three illumination source-imaging system pairs:

$$[w_0 \ w_1 \ w_2] \begin{bmatrix} v_{x0} & v_{y0} \\ v_{x1} & v_{y1} \\ v_{x2} & v_{y2} \end{bmatrix} = [0 \ 0]$$ Equation 22

If we compute the QR factorization of the v matrix we get $$[w_0 \ w_1 \ w_2] Q \begin{bmatrix} \sim & \sim \\ 0 & \sim \\ 0 & 0 \end{bmatrix} = [0 \ 0]$$ Equation 23 where ~ indicates some non-zero element. The condition is seen to be satisfied by $$w^T Q = [0 \ 0 \ 1]$$ Equation 24 which leads to $$w = Q \begin{bmatrix} 0 \\ 0 \\ 1 \end{bmatrix}$$ Equation 25

Figure 13:
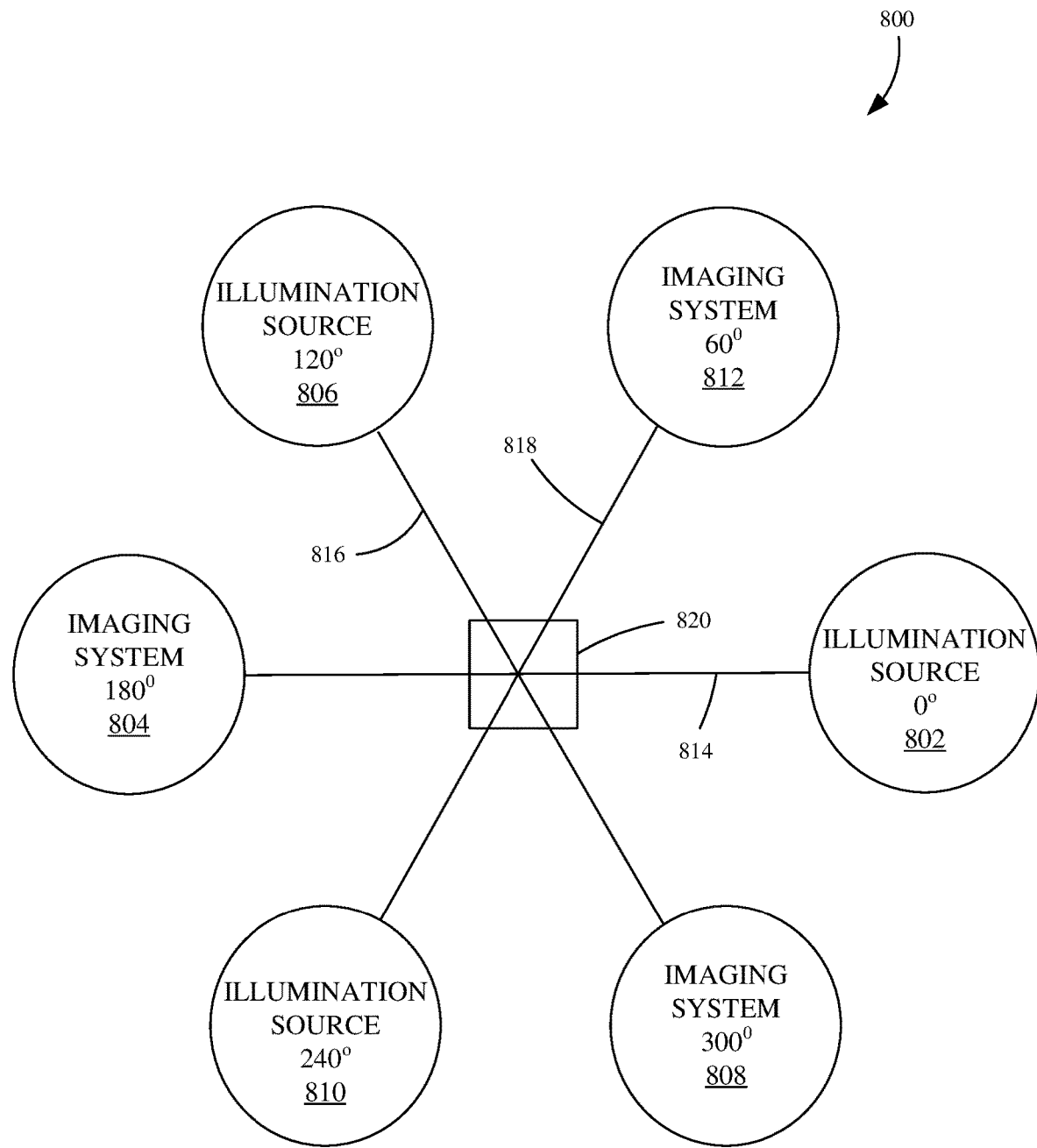
FIG. 13 is a diagrammatic view showing one example of an optical profilometry system in accordance with an embodiment of the present invention.

FIG. 13 is a diagrammatic view showing one example of an optical profilometry system in accordance with an embodiment of the present invention. System 800 includes illumination sources 802, 806, 810, imaging systems 804, 808, 812, optical axes 814, 816, 818, and target 820. System 800 is a three illumination source-imaging system pair optical profilometry system. As described above, such a system is advantageous in that it is configured to capture an image of the target at multiple and varying perspectives. In this way it may reduce, for example, the optical effects of shadows, along with other advantages. The alignment geometry of system 800 shows that each illumination source is aligned 120 degrees from the other. Similarly, each imaging system is aligned 120 degrees from the other. Optical axes 814, 816, and 818 which respectively correspond to a separate illumination source-imaging system pair depict the focus and center of the lens assembly for each respective illumination source-imaging system pair. For example, optical axis 814 corresponds to the focus and center of the lens assembly for the illumination source 802-imaging system 804 pair. Target 820 is a specular target, but could comprise any number of targets including, but not limited to, diffuse targets, combination targets with both specular and diffuse surfaces or components, etc.

The geometrical alignment of system 800 results in the weight terms $w_k$ all being equal. While the alignment geometry depicted in system 800 shows a separation of 120 degrees, other alignment geometries are contemplated. The only requirement for such a system is that no two imaging systems appear at the same azimuth and because the illumination source and imaging system are configured to image a specular target, by defining the illumination source azimuth you necessarily define the imaging system azimuth. In other words, in order to acquire a specular image of the target, for a two camera profilometry system, the imaging system must be placed 180 degrees in azimuth from the illumination source. While system 800 is shown as a three illumination source-imaging system pair optic profilometry system, it is contemplated by the present invention that other pair combinations could also be utilized in an optical profilometry system. For example, a two illumination source-imaging system pair system can also be utilized so long as the imaging systems are 180 degrees apart.

Figure 14A:
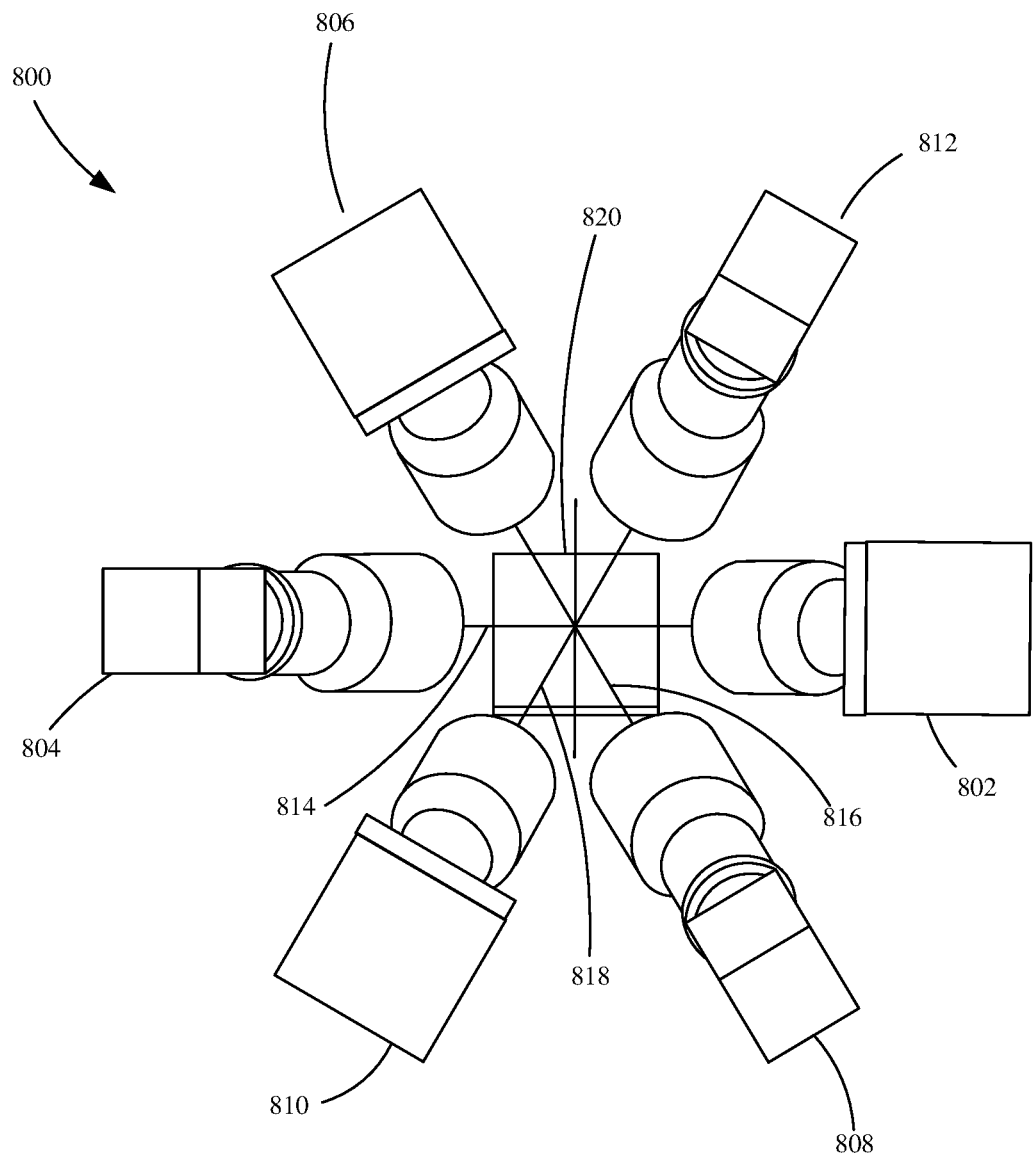
FIG. 14A is a top view showing one example of an optical profilometry system 800.

FIG. 14A is top view showing one example of optical profilometry system 800. System 800 includes illumination sources 802, 806, 810, imaging systems 804, 808, 812, optical axes 814, 816, 818, and target 820.

Figure 14B:
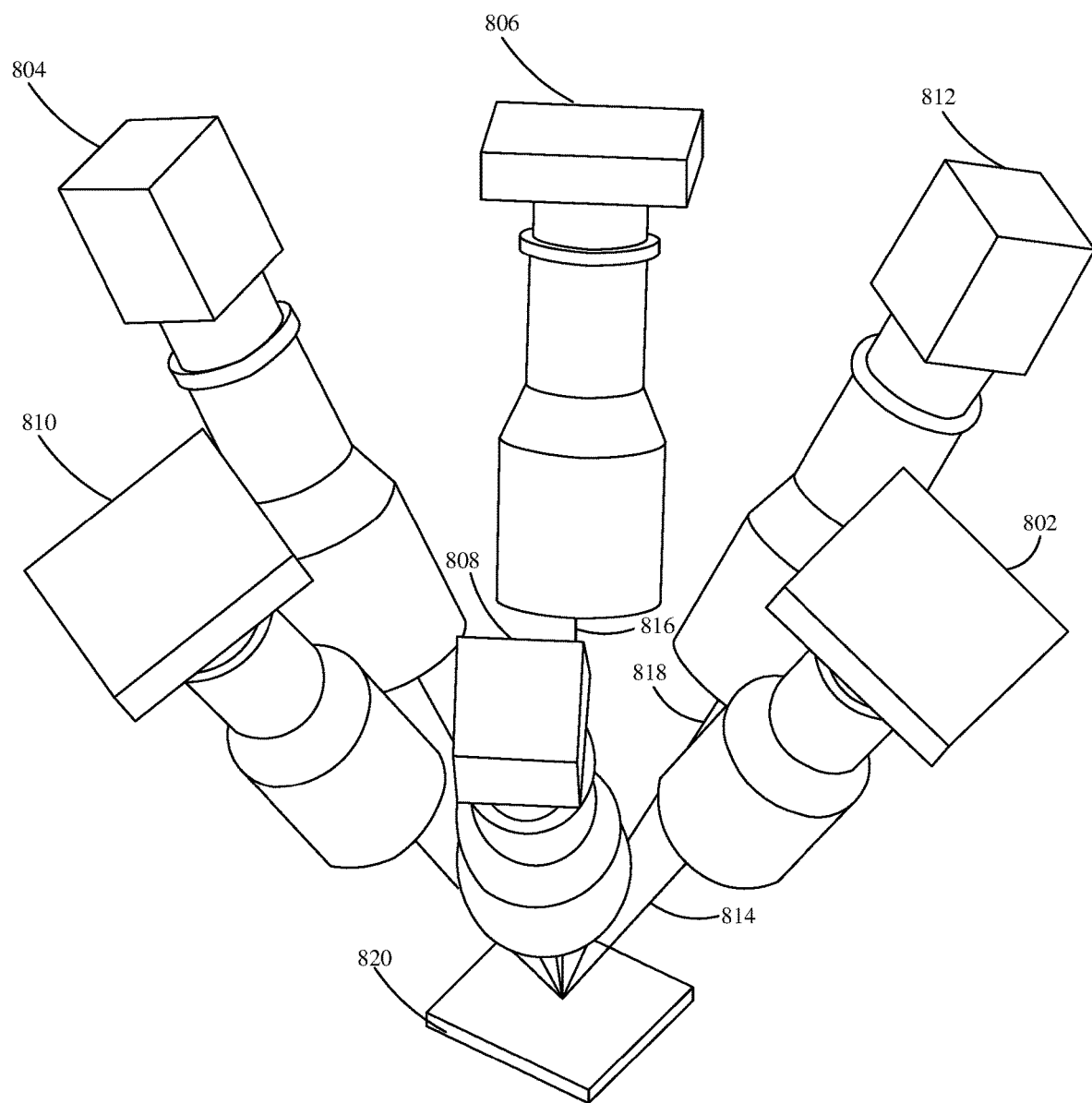
FIG. 14B is a perspective view showing one example of optical profilometry system 800.

FIG. 14B is a perspective view showing one example of optical profilometry system 800. System 800 includes illumination sources 802, 806, 810, imaging systems 804, 808, 812, optical axes 814, 816, 818, and target 820.

Another way to avoid the effects of z height noise on Equation 9, as described above, is to take two measurements at different focus positions.

Figure 15A:
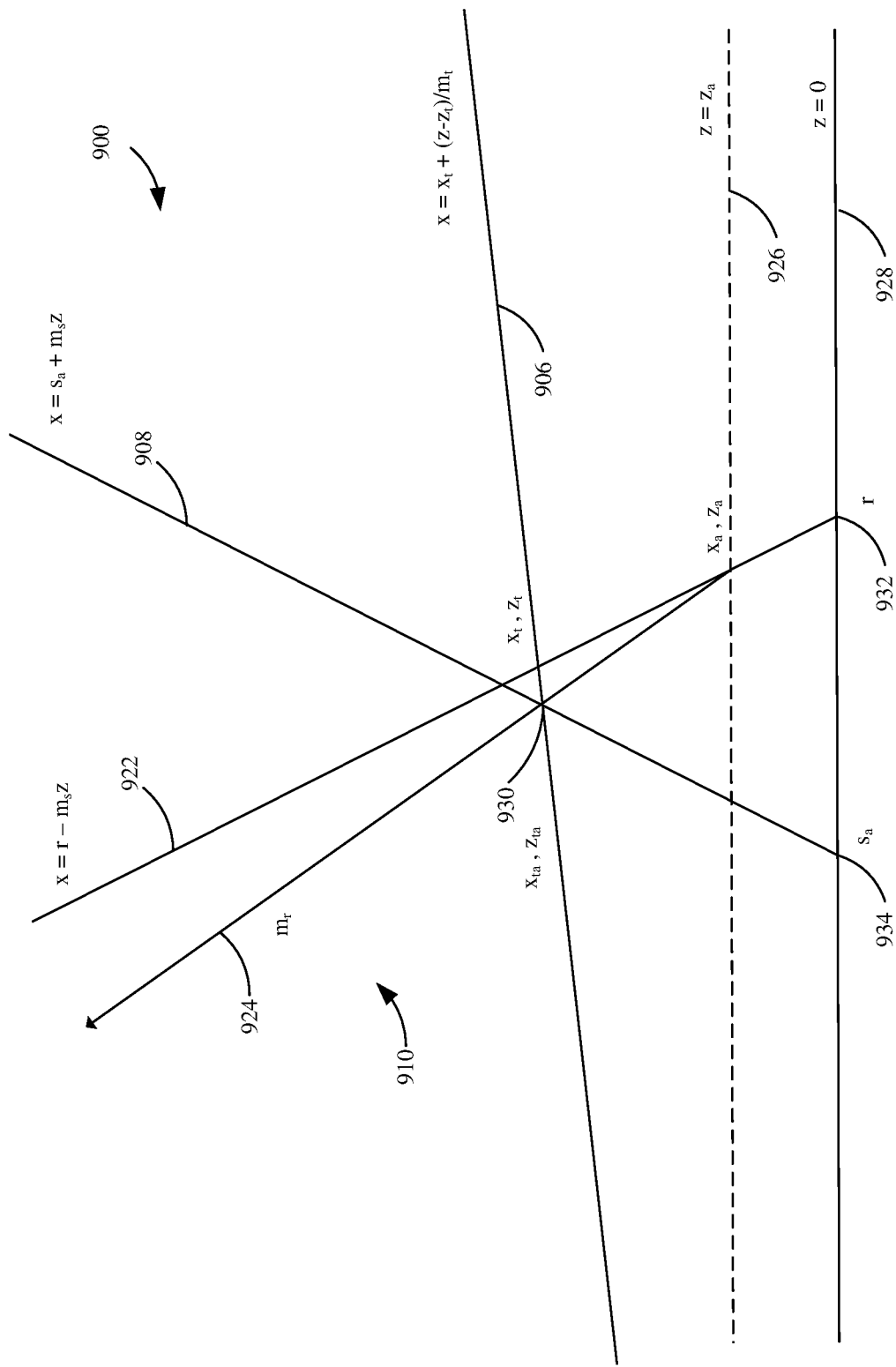
FIG. 15A is a diagrammatic view showing one example of an optical profilometry system.

FIG. 15A is a diagrammatic view showing one example of an optical profilometry system. System 900 includes specular target 906, illumination 908, reflection 910, chief ray 922, received ray 924, focus position 926, ideal focus plane 928, strike points 930, 932, and 934. Illumination 908 is projected by an illumination source and strikes specular target 906 at strike point 930. Illumination 908 is then reflected towards an imaging system as represented by reflection 910. Reflection 910 includes chief ray 922, which represents the ray that enters the imaging system's lens assembly at its center, and received ray which represents the direction of an off-axis reflected ray from a target with tilt, such as target 906. Focus position a 926 represents the plane at which the imaging system of system 900 focuses. Ideal focus plane 928 represents the ideal focus plane for an ideal system, as previously described above.

For purposes of illustration, but not by limitation, the imaging system and illumination source of system 900 have an alignment wherein their slopes are $m_s$. In FIG. 15A illumination 908 intercepts specular target 906 at position $x_{ta}$, $z_{ta}$. Chief ray 922 intercepts target 906 at position $x_t$, $z_t$. Focus position a 926 is located at height position $z_a$. Chief ray 922 and received ray 924 intercept focus position a 926 is at position $x_a$, $z_a$. Ideal focus plane 928 is located at height position z=0. Reflection 910 intercepts ideal focus plane 928 at position r. Illumination 908 intercepts ideal focus plane 928 at position $s_a$. Received ray 924 has a slope $m_r$. Specular target 906 has a slope $m_t$. A position of chief ray 922 can be found by $x=r-m_s z$. A position of illumination 908 can be found by $x=s_a+m_s z$. A position of specular target 906 can be found by $x=x_t+(z-z_t)/m_t$.

Figure 15B:
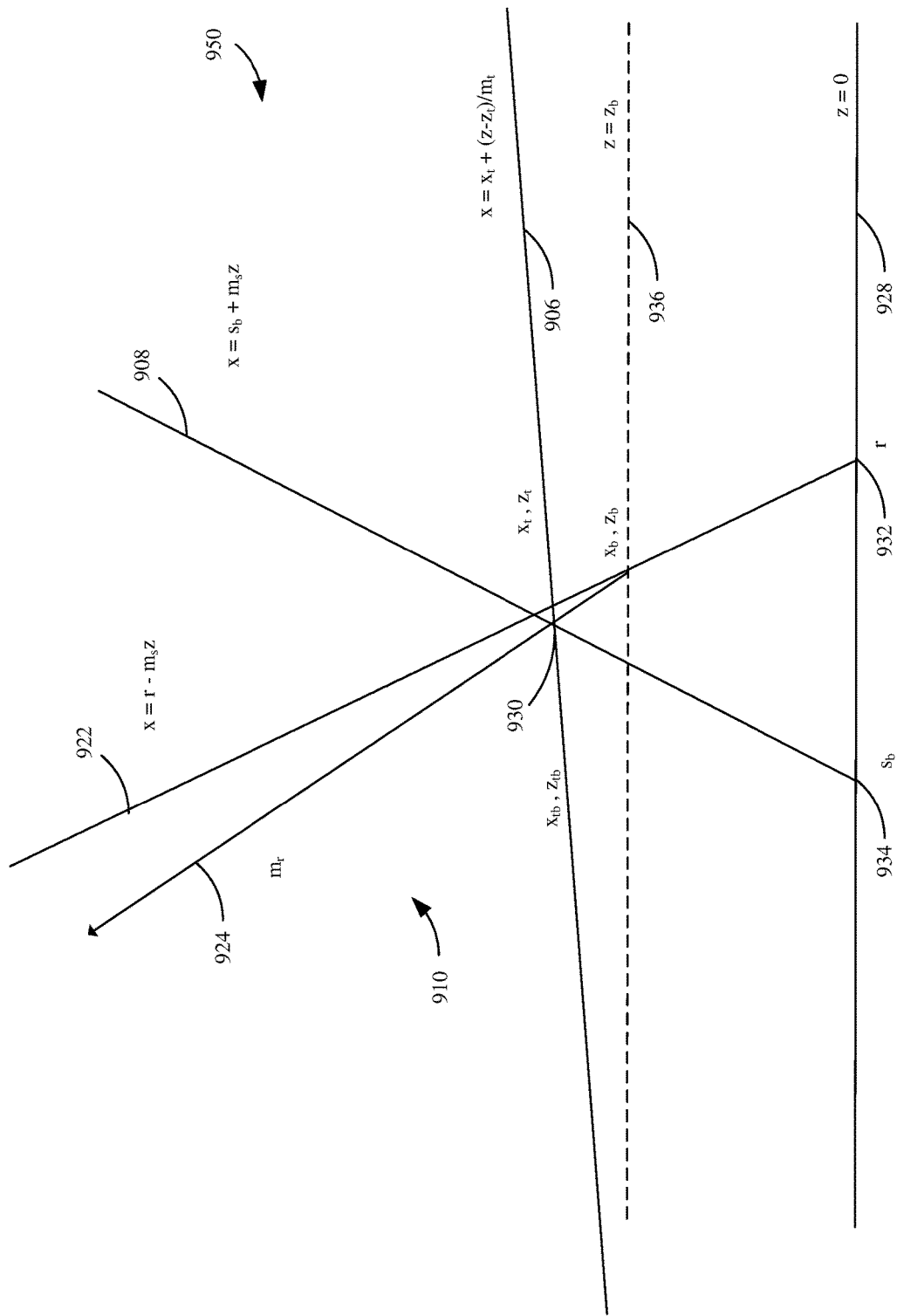
FIG. 15B is a diagrammatic view of system 900 focused at a different focus position.

FIG. 15B is a diagrammatic view of system 900 focused at a different focus position. System 900 in FIG. 15B is similar to system 900 in FIG. 15A except that the imaging system is FIG. 15B is focused at focus position b 936.

In FIG. 15B illumination 908 intercepts target 906 at position $x_{tb}$, $z_{tb}$. Chief ray 922 intercepts specular target 906 at position $x_t$, $z_t$. Focus position b 936 is located at height position $z_b$. Chief ray 922 and received ray 924 intercept focus position b 936 at position $x_b$, $z_b$. Ideal focus plane 928 is located at height position z=0. Reflection 910 intercepts ideal focus plane 928 at position r. Illumination 908 intercepts ideal focus plane 928 at position $s_b$. Received ray 924 has a slope $m_r$. Specular target 906 has a slope $m_t$. A position of chief ray 922 can be found by $x=r-m_s z$. A position of illumination 908 can be found by $x=s_b+m_s z$. A position of specular target 906 can be found by $x=x_t+(z-z_t)/m_t$.

From FIGS. 15A and 15B it can be seen that the imaging system receives light reflected from the target with slope $m_r$. This received ray intersects the chief ray at the focus position (focus plane) of the imaging system (ignoring spherical aberration). For focus position a 926 this intersection occurs at position $x_a$, $z_a$. For focus position b 936 this intersection occurs at position $x_b$, $z_b$. The received ray intersects the target at position $x_{ta}$, $z_{ta}$ for focus position a 926 and at position $x_{tb}$, $z_{tb}$ for focus position b 936. Illumination passing through $x_{ta}$, $z_{ta}$ intercepts the ideal focus plane at $x=s_a$. Illumination passing through $x_{tb}$, $z_{tb}$ crosses the ideal focus plane at $x=s_b$. Thus, variable source positions (e.g. $s_a$ and $s_b$) are found when the imaging system is focused at variable focus positions (e.g. 926 and 936).

At run time, target positions $z_t$ and $m_t$ are estimated based on the measured source positions $s_a$, $s_b$ for pixel r. For convenience, two variables are defined, the mean of and the difference between the two measured source positions $$\bar{s} = \frac{x_a + x_b}{2} \quad \text{Equation 26}$$

$$\Delta s = s_a - s_b \quad \text{Equation 27}$$

Both the target height and the target tilt can be extracted by:

$$z_t = \frac{(r - \bar{s}) + \frac{\Delta s(z_a + z_b)}{2(z_a - z_b)}}{2m_s + \frac{\Delta s}{z_a - z_b}} \quad \text{Equation 28}$$

$$m_t = \frac{-\Delta s}{(m_s^2 + 1)(z_b - z_a) + \sqrt{((m_s^2 + 1)(z_b - z_a))^2 - \Delta s^2}} \approx \quad \text{Equation 29}$$

$$\frac{-\Delta s}{2(m_s^2 + 1)(z_b - z_a)}$$

With this method, lens aberration (e.g. spherical aberration) height correction takes the form of $P(\alpha, \beta, \Delta s)$. This factor is added to the $z_t$ calculated using Equation 28.

In the interest of efficiency, it is desirable to obtain dimensional information relative to a target for two focus positions simultaneously. This can be achieved by using an imaging system that includes a beam splitter and two cameras. Such a system is described in the Figure below.

Figure 16:
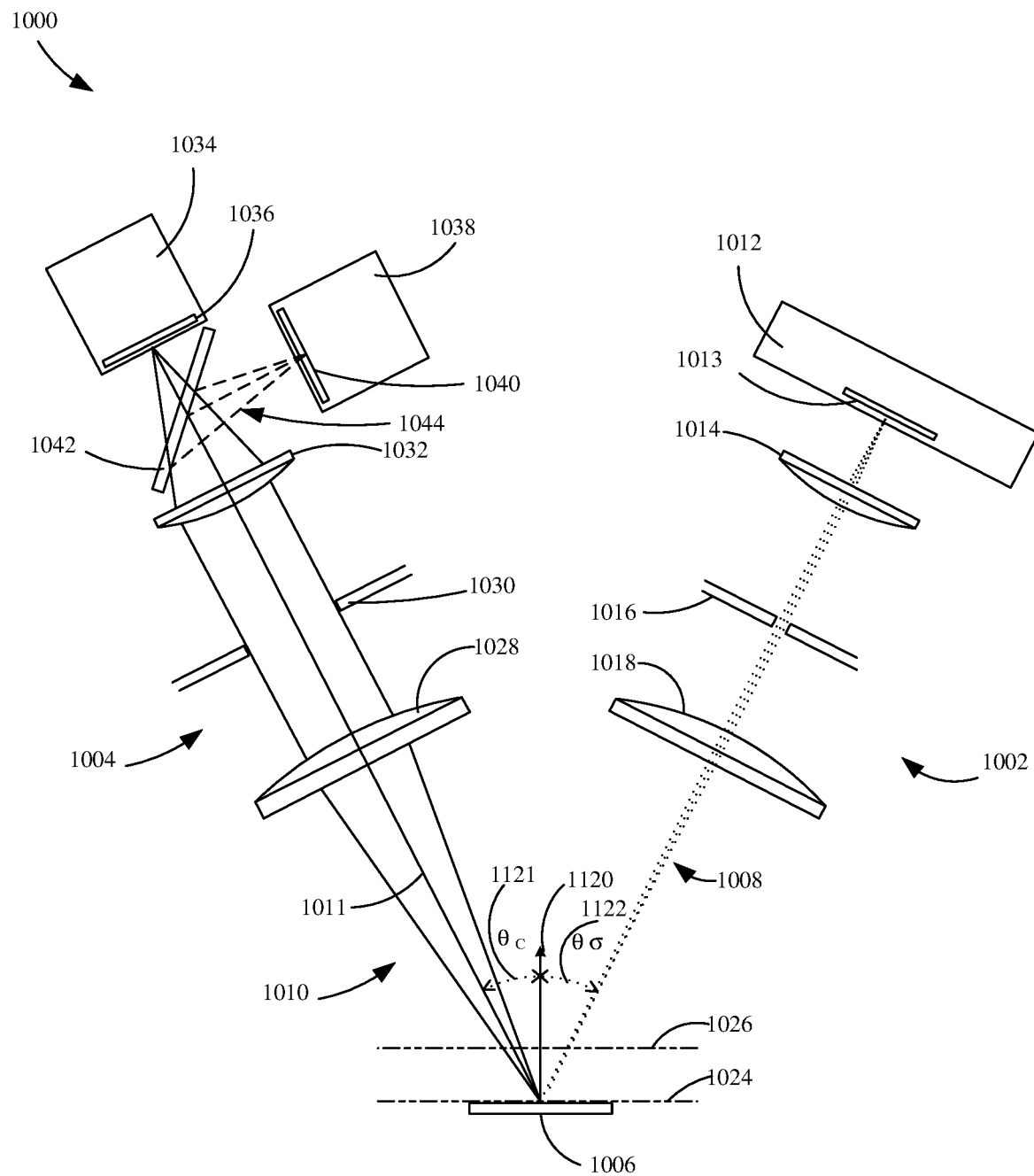
FIG. 16 is a diagrammatic view showing one example of an optical profilometry system in accordance with an embodiment of the present invention.

FIG. 16 is a diagrammatic view showing one example of an optical profilometry system in accordance with an embodiment of the present invention. System 1000 includes illumination source 1002, imaging system 1004, specular target 1006, illumination 1008, reflection 1010, chief ray 1011, normal vector 1020, angle of reflectance 1021, angle of incidence 1022, focus position 1024, and focus position 1026. Illumination source 1002 includes illumination generator 1012 (e.g. a structured light generator), spatial light modulator 1013 (e.g. a digital micromirror device), lens 1014, aperture 1016, and lens 1018. Illumination source 1002 could comprise digital light processing (DLP), transmissive liquid crystal, liquid crystal on silicon (LCOS) and any other suitable techniques for projecting a structured light pattern. Imaging system 1004 includes lens 1028, aperture 1030, lens 1032, camera 1034, image plane 1036, camera 1038, image plane 1040, beam splitter 1042, and split beam 1044. System 1000 comprises a telecentric lens system incorporating two cameras (e.g. 1034 and 1038) each viewing the same target (e.g. 1006) and sharing the same lens axis.

Illumination 1008 is projected onto target 1006 by illumination source 1002 which is reflected from target 1006 towards imaging system 1004 as represented by reflection 1010. As reflection 1010 passes through imaging system 1004 it reaches beam splitter 1042. Beam splitter 1042 (a 50-50 beam splitter) provides an optical path for both camera 1034 and 1038. Thus, reflection 1010 is received by both image plane 1036 of camera 1034 and image plane 1040 of camera 1038. Image plane 1036 of camera 1034 is positioned relative to beam splitter 1042 such that its focus position is focus position 1024. Image plane 1040 of camera 1038 is positioned relative to beam splitter 1042 such that its focus position is focus position 1026. In other words, a target at a height position consistent with focus position 1024 will be in focus for camera 1034 and a target at a height position consistent with focus position 1026 will be in focus for camera 1038. The parallel capture timing of system 1000 allows it to simultaneously acquire an image of target 1006 at two different focus positions (e.g. 1024 and 1026).

While in FIG. 16 it is shown that the numerical aperture 1016 of illumination source 1002 is smaller than the numerical aperture 1030 of imaging system 1004, it is contemplated by the present invention that in an alternative embodiment, the numerical aperture of the illumination source is larger than the numerical aperture of the imaging system. In another embodiment, the numerical apertures of both the illumination source and the imaging system are equivalent.

Another technique for obtaining dimensional information relative to a target for multiple focus positions is an optical profilometry system having adjustable components. If extra capture time is allowed, then adjustable optic systems can be used to obtain dimensional information relative to a target for multiple focus positions sequentially. Adjustable optic systems are advantageous in that they can adapt to targets placed at a wide variety of heights. Such systems are described below.

Figure 17:
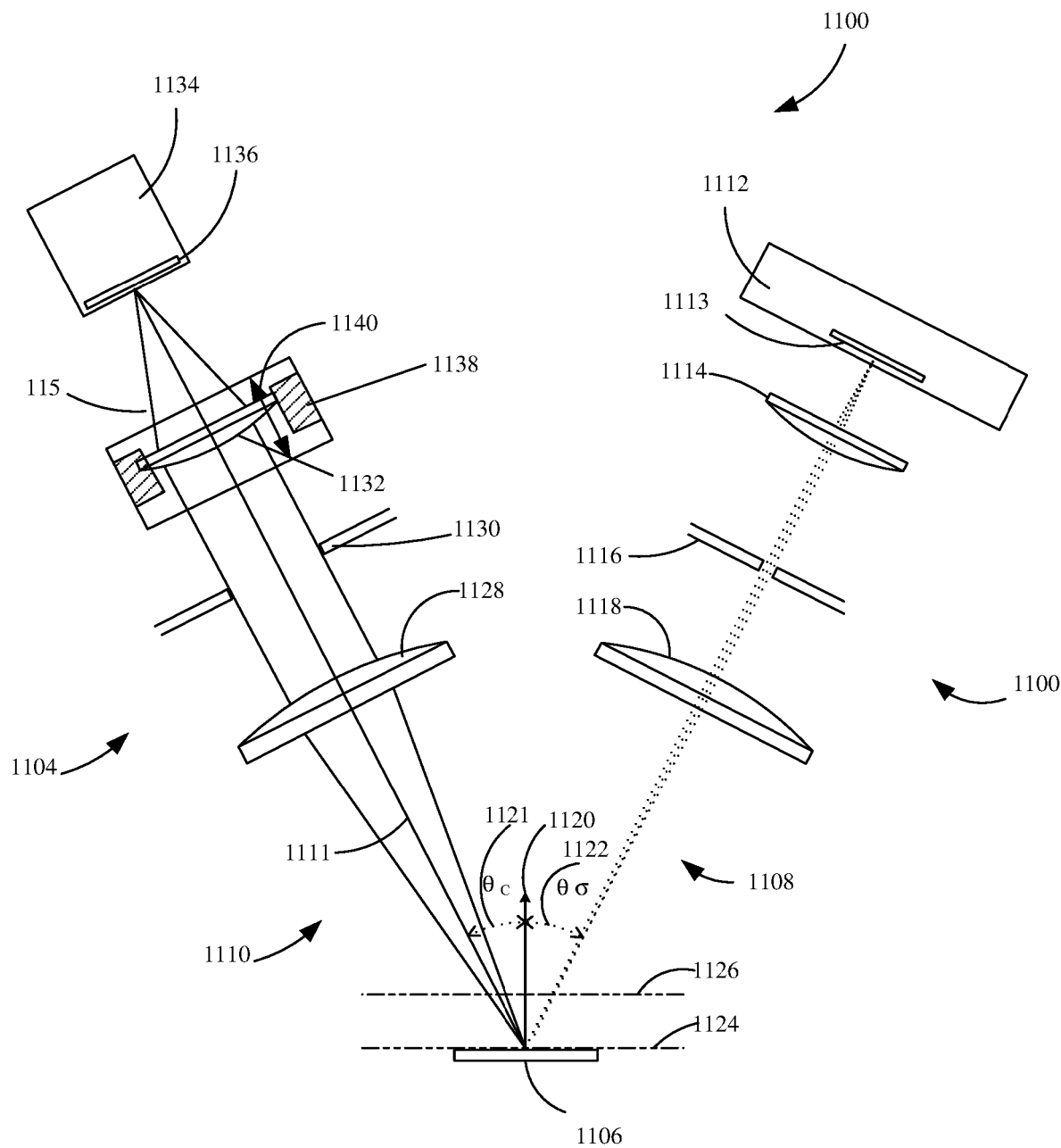
FIG. 17 is a diagrammatic view showing one example of an optical profilometry system in accordance with an embodiment of the present invention.

FIG. 17 is a diagrammatic view showing one example of an optical profilometry system in accordance with an embodiment of the present invention. System 1100 is similar system 1000 except that it includes adjustable lens components. System 1100 includes illumination source 1102, imaging system 1104, specular target 1106, illumination 1108, reflection 1110, chief ray 1111, normal vector 1120, angle of reflectance 1121, angle of incidence 1122, focus position 1124, and focus position 1126. Illumination source 1102 includes illumination generator 1112 (e.g. a structured light generator), spatial light modulator 1113 (e.g. a digital micromirror device), lens 1114, aperture 1116, and lens 1118. Illumination source 1002 could comprise digital light processing (DLP), transmissive liquid crystal, liquid crystal on silicon (LCOS) and any other suitable techniques for projecting a structured light pattern. Imaging system includes lens 1128, aperture 1130, adjustable lens 1132, camera 1134, image plane 1136, adjustment device 1138, and optical axis 1140 as represented by arrow 1140. System 1100 comprises a telecentric lens system.

While in FIG. 17 it is shown that the numerical aperture 1116 of illumination source 1102 is smaller than the numerical aperture 1130 of imaging system 1104, it is contemplated by the present invention that in an alternative embodiment, the numerical aperture of the illumination source is larger than the numerical aperture of the imaging system. In another embodiment, the numerical apertures of both the illumination source and the imaging system are equivalent.

System 1100 can produce images of specular target 1106 at two different focal positions (e.g. 1124 and 1126) by modifying the focal length of imaging system 1104. Such modification can be done by adjusting the position of lens 1132 with adjustment device 1138 along optical axis 1140 as represented by arrow 1140. Adjustment device 1138 could be, for example, a voice coil actuator or a piezo driven actuator, or any other suitable technique such that lens 1132 can be moved along optical axis 1140. Two images of target 1106 can be captured in sequence at two different focal positions (e.g. 1124 and 1126) by adjusting lens 1132 between image captures.

Additionally, while FIG. 17 only depicts two focus positions (e.g. 1124 and 1126) it is contemplated that multiple focus positions can be achieved. The amount of focus positions available for such systems are limited only by the adjustability limitations of the systems. For example, the amount of focus positions available for system 1100 is limited to the dimensions of the adjustment axis for the adjustment device, whereas, for example, in the embodiment described below, the amount of focus positions is limited by the amount of curvature adjustment available.

In another embodiment, adjustment device 1138 is replaced by a variable focus lens. Such a lens could comprise an electro-optical lens that changes its shape between image captures, thus changing its focus position. In such a system, the curvature of the lens is adjusted by applying an electrical current.

In another embodiment, focus position may be adjusted by including a variable power lens in the optical path. For instance, a liquid lens assembly could be included near the aperture of the imaging system's lens assembly. This would adjust the focus position with little effect on the magnification of the lens.

In another embodiment, focus position may be adjusted by including a glass plate that is inserted into the optical path, for instance, at some point after the last lens in the imaging system. In another embodiment the image plane could be adjustable. In another embodiment the entire camera assembly could be adjustable.

Another technique to avoid the effects of z height noise on Equation 9 involves moving the target. The linearity of the reconstruction can be exploited to derive a measure of height that is invariant with respect to pupil-illumination effects by mounting the target on a z stage and driving the stage such that each feature is at $z=0$, a position that is invariant with respect to pupil-illumination effects.

As is described above, an optical phase profilometry system obtaining dimensional information relative to specular targets is sensitive to lens aberrations such as field curvature and spherical aberration. Therefore, an optical phase profilometry system must measure these aberrations and compensate for their effects if accurate dimensional information relative to specular targets is to be obtained.

Traditional phase profilometry systems (typically imaging diffuse targets) are sensitive to aberrations causing geometrical distortion and telecentricity errors but are largely insensitive to spherical aberration or field curvature. To successfully measure specular targets a calibration method which measures both the traditional aberrations as well as the additional aberrations (e.g. spherical aberration and field curvature). Such a method is described below.

Figure 18A:
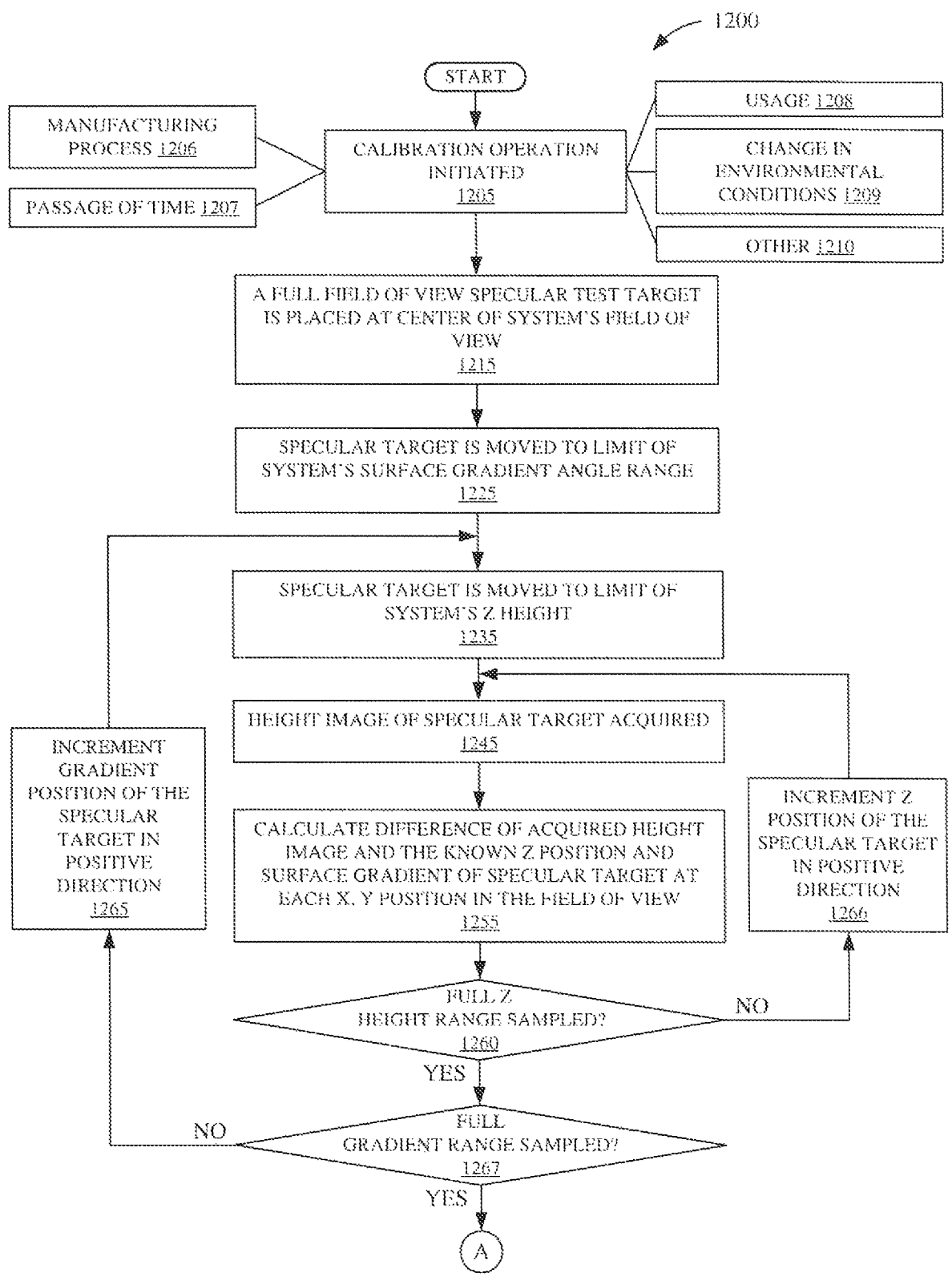
FIG. 18A-B is a flowchart showing one example of calibration method for an optical profilometry system.
Figure 18B:
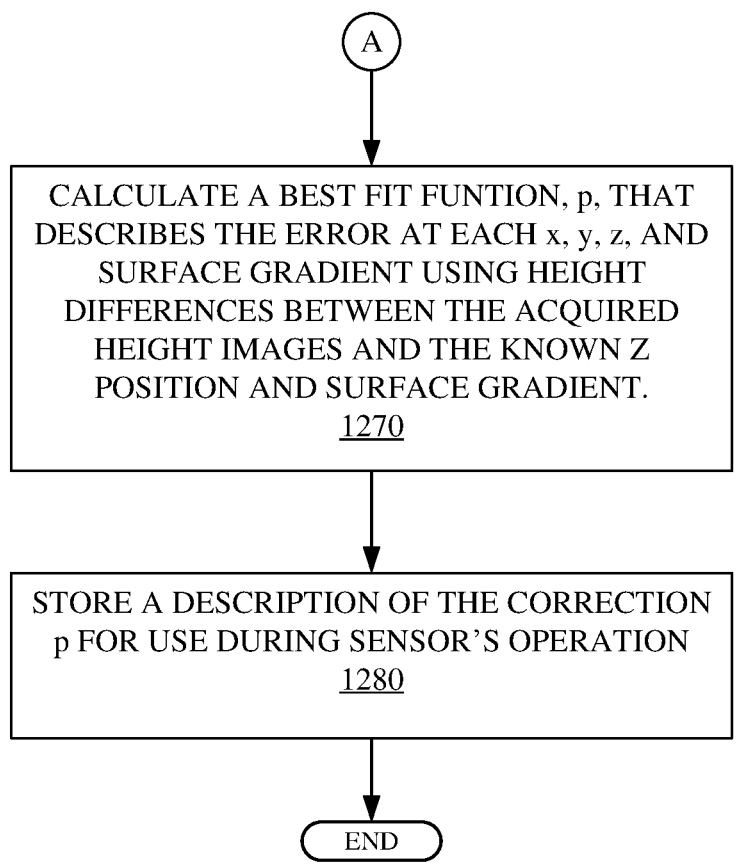

FIG. 18A-B, herein collectively referred to as FIG. 18, is a flowchart showing one example of a calibration method for an optical profilometry system. Method 1200 starts at block 1205 where the calibration operation is instituted. Typically, the calibration operation is initiated as part of the system's normal manufacturing process 1206. The calibration operation could also be initiated periodically after a certain amount of time 1207, or the calibration method could be based on other factors, such as, system usage 1208 or a change in system's environmental conditions 1209. The operation could be instituted automatically by, for example, a control system coupled to the optical profilometry system that generates a control signal to initiate the calibration method. The operation could be instituted manually, by, for example, a user or operator that generates some form of input upon a user interface such as a display screen, a computer, a control pad, a lever, a switch, or any other suitable technique for receiving a user or operator input. The calibration operation may be instituted on the basis of a threshold, such as, but not limited to, a selected (or otherwise determined) range of acceptable values. The threshold could be user or operator selected, determined by the manufacturer, or determined by the system based on historical data or based on the characteristics of the targets being imaged, or any other suitable technique for determining a threshold. The calibration method could be initiated based on a time interval 1209, where the calibration is initiated whenever a certain amount of time has passed. Or the calibration method could be initiated based on other factors, such as, but not limited to, efficiency, user or operator desire, mandatorily whenever the system is run, etc.

Method 1200 continues at block 1215 where a full field of view specular test target is placed at the center of the system's field of view; mounted on a motion system capable of positioning the test target at a known z height and known surface gradient angle (tip angle). The test target at block 1215 is initially placed at the system's maximum positive z height and maximum positive surface gradient angle range. Method 1200 continues at block 1225 where the specular test target is moved to the negative limit of the system's surface gradient angle range. Method 1200 continues at block 1235 where the specular test target is moved to the negative limit of the system's z height range.

Method 1200 continues at block 1245 where height images of the specular test target are generated. Method 1200 continues at block 1255 where the difference of the generated height images and the known z position and surface gradient angle of the specular test target at each x, y, position in the system's field of view is calculated.

Method 1200 continues at block 1260 where it is determined if the system's full z height range has been sampled. If no, then method 1200 continues at block 1266. At block 1266, the motion system is incremented in the positive z height direction, and the next image of the target is acquired (block 1245). Once images are acquired throughout the full range in the z height direction, method 1200 continues to block 1267 where it is determined if the system's full surface gradient range has been sampled. If no, then method 1200 continues at block 1265 where the motion system is incremented in the positive surface gradient angle range direction.

If at block 1260 it is determined that the full z range has been sampled, then method 1200 continues at block 1270 where a best fit function p that describes the error at each x, y, z, and surface gradient using the differences between the acquired height images and the known z position and surface gradient of the specular test target at each x, y position is calculated.

Method 1200 continues at block 1280 where the best fit function p is stored. Function p can be stored in a memory component associated with the particular profilometry system, such as, a memory component coupled to the optical profilometry system.

FIG. 18 depicts method 1200 in a particular order for purposes of illustration, but not by limitation. It is contemplated that the order of steps of method 1200 could be changed without affecting the purposes of method 1200. For example, at block 1215, the test target could begin at the maximum negative range, or at any other known position and at block 1225 the test target could be moved to any known position in any direction (e.g. either towards the negative range or the positive range). The order is not determinative, for the purposes of method 1200 the test target just needs to move to known positions throughout the positive and negative range of the system. Similarly, at blocks 1265 and 1266, it is contemplated that the motion system could be moved in a negative direction, or in a combination of a negative direction and a positive direction. The order is not determinative. The test target must, for the purposes of this method, move throughout the positive and negative range of the system.

Figure 19:
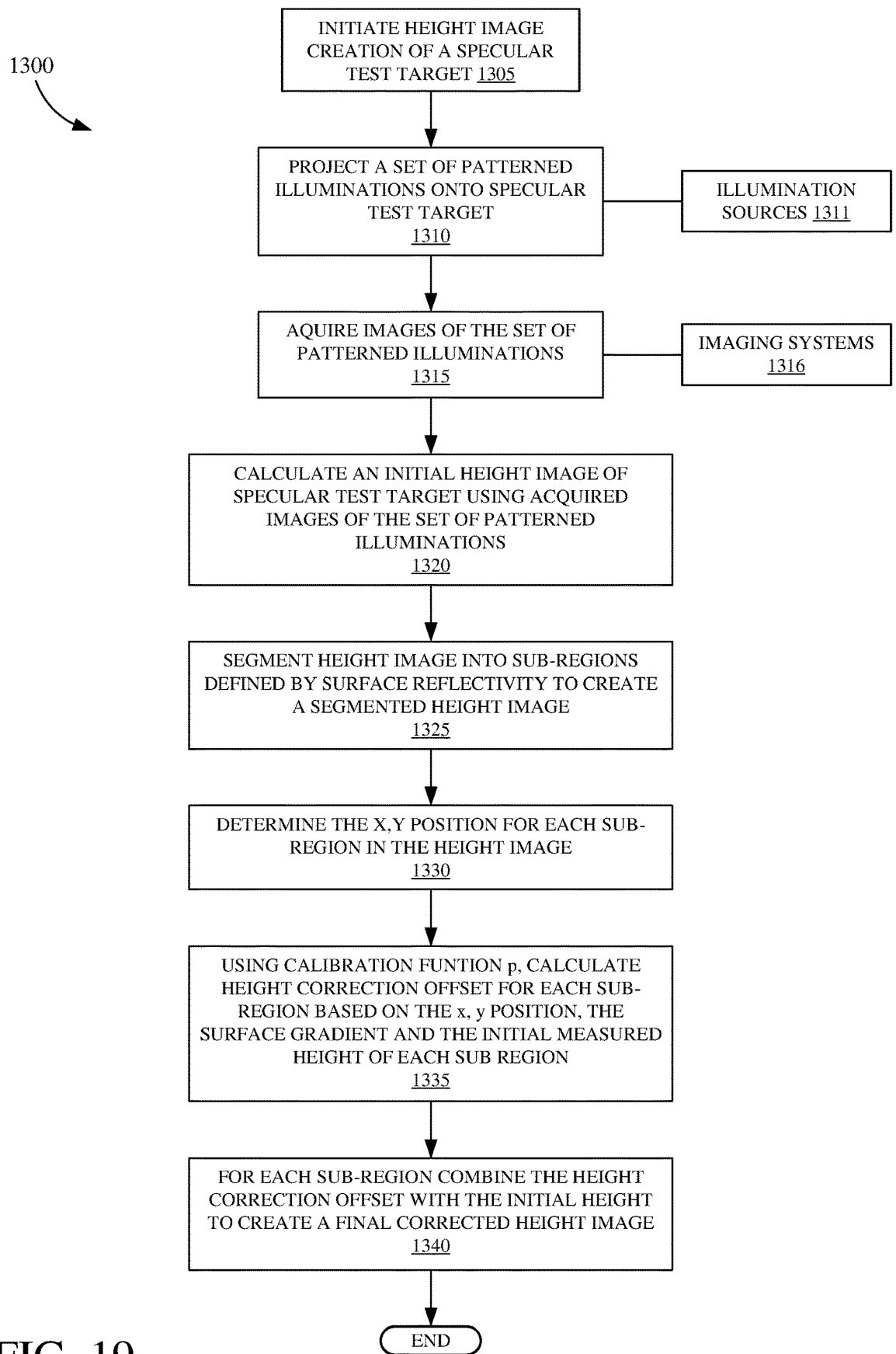
FIG. 19 is a flowchart showing one example of a method of generating an image corresponding to a specular target using calibration offset.

FIG. 19 is a flowchart showing one example of a method of generating an image corresponding to a specular target using calibration offset. Method 1300 begins at block 1305 where the height image creation of a specular test target is initiated. Method 1300 continues at block 1310 where a set of patterned illuminations are projected onto the specular test target. The illuminations at block 1310 could be projected by any of the illumination sources 1311 described herein. Method 1300 continues at block 1315 where images of the set of patterned illuminations are acquired. Such images could be acquired by any of the imaging systems 1316 described herein.

Method 1300 continues at block 1320 where an initial height image of the specular test target using the acquired images of the set of patterned illuminations is calculated. Method 1300 continues at block 1325 where the initial height image is segmented into sub-regions defined by surface reflectivity to create a segmented height image. Method 1300 continues at block 1330 where the x, y position for each sub-region in the segmented height image is determined.

Method 1300 continues at block 1335 where, using calibration function p (as described above), the height correction offset for each sub-region is calculated based on the x, y position, the surface gradient and the measured height of each sub-region. Method 1300 continues at block 1340 where, for each sub-region, the height correction offset and the initial height of each sub-region to calculate a final, corrected height image.

Figure 20:
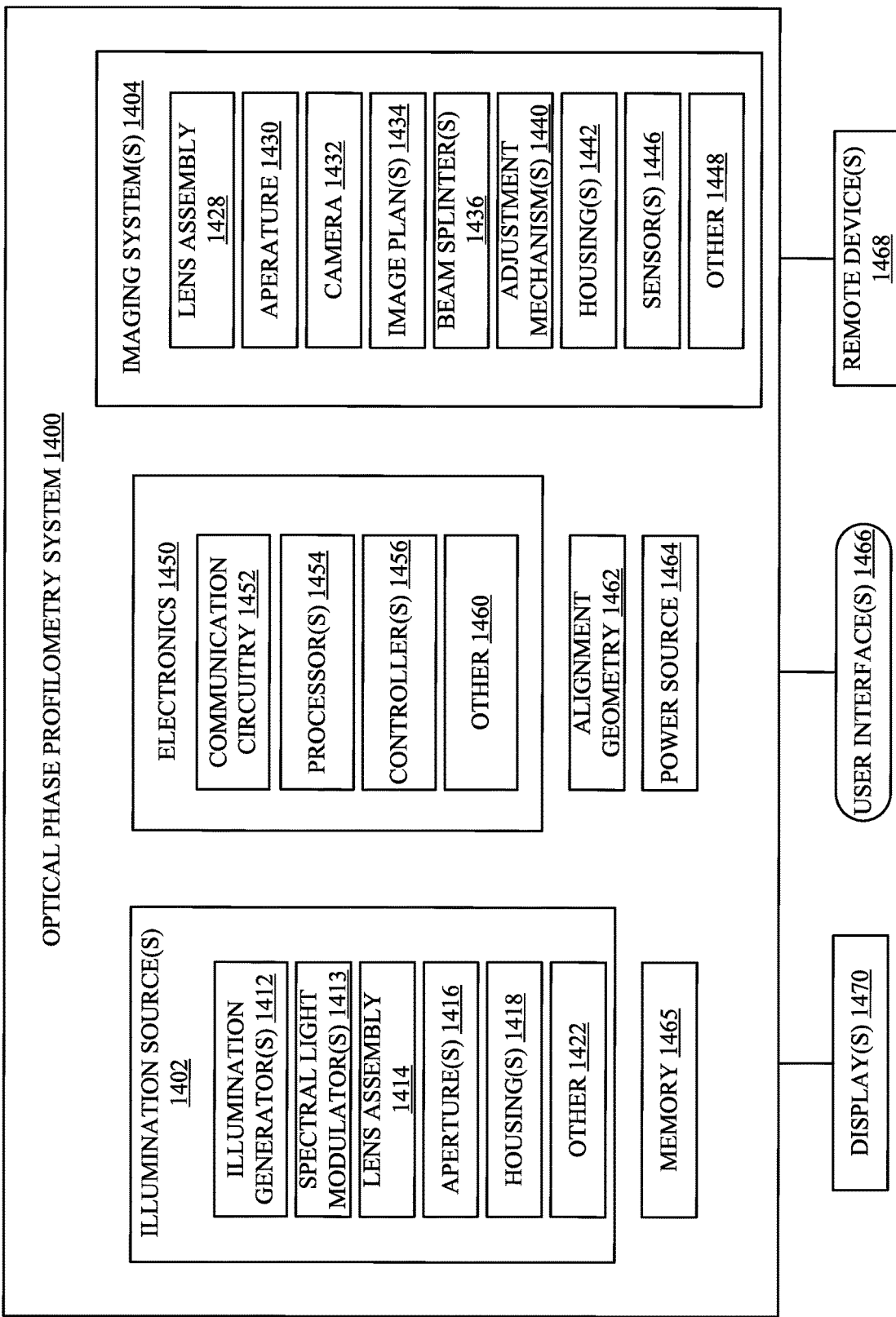
FIG. 20 is a simplified block diagram showing one example of an optical profilometry system in accordance with an embodiment of the present invention.

FIG. 20 is a simplified block diagram showing one example of an optical profilometry system in accordance with an embodiment of the present invention. System 1400 includes illumination source(s) 1402, imaging system(s) 1404, electronics 1450, alignment geometry 1462, power source 1464, user interface(s) 1468, and remote device(s) 1468.

Illumination source(s) 1402 includes illumination generator(s) 1412, spatial light modulator(s) 1413, lens assembly 1414, aperture(s) 1416, housing 1418, power source 1420, and other 1422. Illumination source(s) 1402 could comprise any of the embodiments described herein, including single illumination source and multiple illumination sources systems. Illumination generator(s) are configured to generate an illumination (e.g. a structured or patterned illumination) to be projected onto a target. Illumination generators could comprise a structured light generator, digital light processing (DLP), transmissive liquid crystal, liquid crystal on silicon (LCOS) or any other suitable techniques for projecting a structured light pattern. Spatial light modulator(s) 1413 could comprise a digital micromirror device.

Lens assembly 1414 is configured to direct illumination from illumination source 1402 towards a target and could comprise a telecentric lens assembly, an entrance lens and an exit lens, two or more lenses, and lenses made from various materials including, but not limited to, polycarbonates, plastics, polymers, glass, liquid lens material, and any other suitable materials. Aperture(s) 1416 are configured to direct illumination from illumination source 1402 and could comprise a numerical aperture larger than the numerical aperture of imaging system(s) 1404, a numerical aperture smaller than the numerical aperture of imaging system(s) 1404, or a numerical aperture equivalent to the numerical aperture of imaging system(s) 1404.

Housing(s) 1418 are configured to define a body of illumination source(s) 1402 and house components of illumination source(s) 1402. Housing(s) 1418 could comprise any number of materials including, but not limited to, plastics, polymers, metals or any other suitable materials. Housing(s) 1418 could comprise any of the embodiments herein described, for example, those depicted in FIGS. 14A and 14B. Other 1422 could comprise any other components suitable to be used by an illumination source to project a structured illumination onto a target.

Imaging system(s) 1404 include lens assembly 1428, aperture(s) 1430, camera(s) 1432, image plane(s) 1434, beam splitter(s) 1436, adjustment mechanism(s) 1440, housing(s) 1442, sensor(s) 1446, other 1448. Imaging source(s) 1404 are configured to receive an illumination projected from illumination source(s) 1402 which reflect from a target.

Lens assembly 1428 is configured to direct illumination reflected from a target towards interior components (e.g. camera(s) 1432, image plane(s) 1434, and beam splitter(s) 1436) of imaging system(s) and could comprise a telecentric lens assembly, an entrance lens and an exit lens, two or more lenses, adjustable lenses, and lenses made from various materials including, but not limited to, polycarbonates, plastics, polymers, glass, liquid lens material, and any other suitable materials. Aperture(s) 1430 are configured to direct illumination reflected from a target towards interior components of imaging system(s) 1404 and could comprise a numerical aperture larger than the numerical aperture of illumination source(s) 1402, a numerical aperture smaller than the numerical aperture of illumination source(s) 1402, or a numerical aperture equivalent to the numerical aperture of illumination source(s) 1402.

Camera(s) 1432 are configured to receive illumination projected by illumination source(s) 1402 and reflected from a target towards imaging system(s) 1404. Camera(s) 1432, could include sensor(s) 1446, configured to generate a sensor signal, based on the received illumination, indicative of an image of a target. Image plane(s) 1434 are part of camera(s) 1432 and define a surface of the camera onto which the reflected illumination is focused after it passes through the interior components of imaging system(s) 1404 (e.g. lens assembly 1428, aperture(s) 1430, beam splitter(s) 1436). Beam splitter(s) 1436 is configured to receive the reflected illumination and split the reflected ray bundle in two or more ray bundles, for example, the beam splitter as described in FIG. 16 (e.g. 1042).

Adjustment mechanism(s) 1440 are devices configured to change a position or a characteristic of lens assembly 1428 or another component of imaging system(s) 1404. Adjustment mechanism(s) 1440 could comprise a mechanical device configured to change a position of a lens such that the focus point of the lens is changed (e.g. 1138). Adjustment mechanism(s) 1440 could comprise an electro-optical lens that changes its shape between image captures such that its focus position is changed. In such a system, the curvature of the lens is adjusting by applying an electrical current. Adjustment mechanism(s) 1440 could comprise a variable power lens, for instance, a liquid lens assembly. Adjustment mechanism(s) could comprise a device configured to change a position of image plane(s) 1434. Adjustment mechanism(s) could comprise a device configured to change a position of camera(s) 1432. Adjustment mechanism(s) 1440 could comprise any other suitable devices or techniques such that the focus position of the imaging system could change.

Housing(s) 1442 are configured to define a body of imaging system(s) 1404 and house components of imaging systems(s) 1404. Housing(s) 1442 could comprise any number of materials including, but not limited to, plastics, polymers, metals or any other suitable materials. Housing(s) 1442 could comprise any of the embodiments herein described, for example, those depicted in FIGS. 14A and 14B. Sensor(s) 1446 could comprise any number of sensors configured to generate a signal indicative of a characteristic of received illumination, target dimensional information, a captured image, etc. Other 1448 could include any other suitable components configured to allow imaging system(s) 1404 to receive illumination or obtain dimensional information relative to a target, for example, other 1448 could comprise a glass plate that is inserted into the optical path of imaging system(s) 1404, for instance, at some point after the last lens thereby adjusting the focus position of imaging system(s) 1404.

Electronics 150 include communication circuitry 1452, processor(s) 1454, controller(s) 1456, and other 1460. Communication circuitry 1452 is configured to communicate with other components of system 1400 (e.g. imaging system(s) 1404 and illumination source(s) 1402), as well external components (e.g. user interface(s) 1466, remote device(s) 1468, and display(s) 1470). Processor(s) 1454 are configured to receive signals and other input relative to a target and, based on those signals and input, determine and calculate characteristics relative to the target (e.g. height, slope, x, y position, etc.). For example, such processors can be adapted, via hardware, software, or a combination thereof, for receiving acquired images from imaging system(s) 1404 and calculating an initial height image, segmenting the height image into sub-regions, determining the x, y position for each sub-region, determining the surface gradient for each sub-region, calculating height correction, and calculating a corrected height image as described in FIG. 19. Similarly, processor(s) 1454 are configured to calculate and solve the equations herein described.

Controller(s) 1456 are configured to receive signals from processor(s) 1454, and other components (e.g. user interface(s) 1466) and generate control signals to control components of system 1400. For example, controller(s) 1456 could receive an output from processor(s) 1454 indicative of a need to initiate a calibration process. Controller(s) 1456 could then generate a control signal to have imaging system(s) 1404 capture an image of the specular test target, as described in FIG. 17. Similarly, controller(s) 1456 could generate a control signal to have communication circuitry 1452 store a description of the correction function p, calculated by processor(s) 1454, in memory 1465 as described in FIG. 17. Additionally, controller(s) 1454 could receive input from user interface(s) 1466 indicative of a need to control a component of system 1400 and generate a control signal to have, for example, adjustment mechanism(s) 1440 change a position or a characteristic of lens assembly 1428. Additionally, controller(s) 1456 could generate a control signal to have display(s) 1470 display information relative to system 1400 based on some received input, for example, an input from processor(s) 1454 that system 1400 requires calibration. In such an example, controller(s) 1456 could generate a control signal to set off an audible alarm or to turn on a visible status light indicative of a status of system 1400.

Alignment geometry 1462 is the positional and alignment structure of system 1400. Alignment geometry 1462 could comprise the vertical or horizontal position of illumination source(s) 1402 or imaging system(s) 1404, geometry 1462 could comprise the azimuth, or the optical axis of illumination source(s) 1402 or imaging system(s) 1404. Geometry 1462 could comprise any of the systems, methods, techniques, or embodiments described herein, for example the alignment geometry described in FIGS. 13-14B.

Power source 1464 is configured to provide power to the components of system 1400. Power source 1464 could comprise a battery, or a wired connection to an electric circuit or any other suitable techniques such that the components of system 1400 will be powered. Additionally, each of the individual subsystems of system 1400 (e.g. illumination source(s) 1402, imaging system(s) 1404, and electronics 1450 could include their own power source (e.g. a battery or an individual connection to electronic circuit) such that they are powered independently from one another. Power source 1464 could also comprise any combination of these.

Memory 1465 is configured to store data (e.g. dimensional information relative to a target, calculations, determinations, instructions, etc.) and calibration information, such as correction function p) as described above. Memory 1465 could comprise RAM, ROM, Cache, Dynamic RAM, Static RAM, Flash Memory, Virtual Memory, Video Memory, BIOS, or any other suitable form of memory. Memory 1465 is preferably electrically coupled to system 1400.

User interface(s) 1466 are configured to receive a user or operator input, for example, to control system 1400. User interface(s) could comprise a touch-screen display, switches, levers, an electronic control board, buttons, a control board, or any other suitable techniques for receiving a user or operator input. Remote device(s) 1468 could comprise devices electronically coupled to, but remote from, system 1400 such as a computer in a control room on a wired loop. Remote device(s) 1468 could also comprise devices wirelessly coupled to system 1400 such as handheld devices, laptops, tablets, computers off-site. Remote device(s) can be configured to display, receive, and send information relative to system 1400 (e.g. dimensional information relative to a target, performance analytics, alerts and notifications, etc.). Display(s) 1470 are configured to display information relative to system 1400. Display(s) 1470 could comprise visible displays such as screen displays, or lights configured to display a status of system 1400 (e.g. warning lights). Display(s) 1470 could comprise audible displays configured to generate a noise to convey information relative to system 1400 (e.g. an alarm).

While system 1400 has been described above, it is contemplated that any and all of the systems, methods, techniques and embodiments herein described could be incorporated into system 1400.

Figure 21:
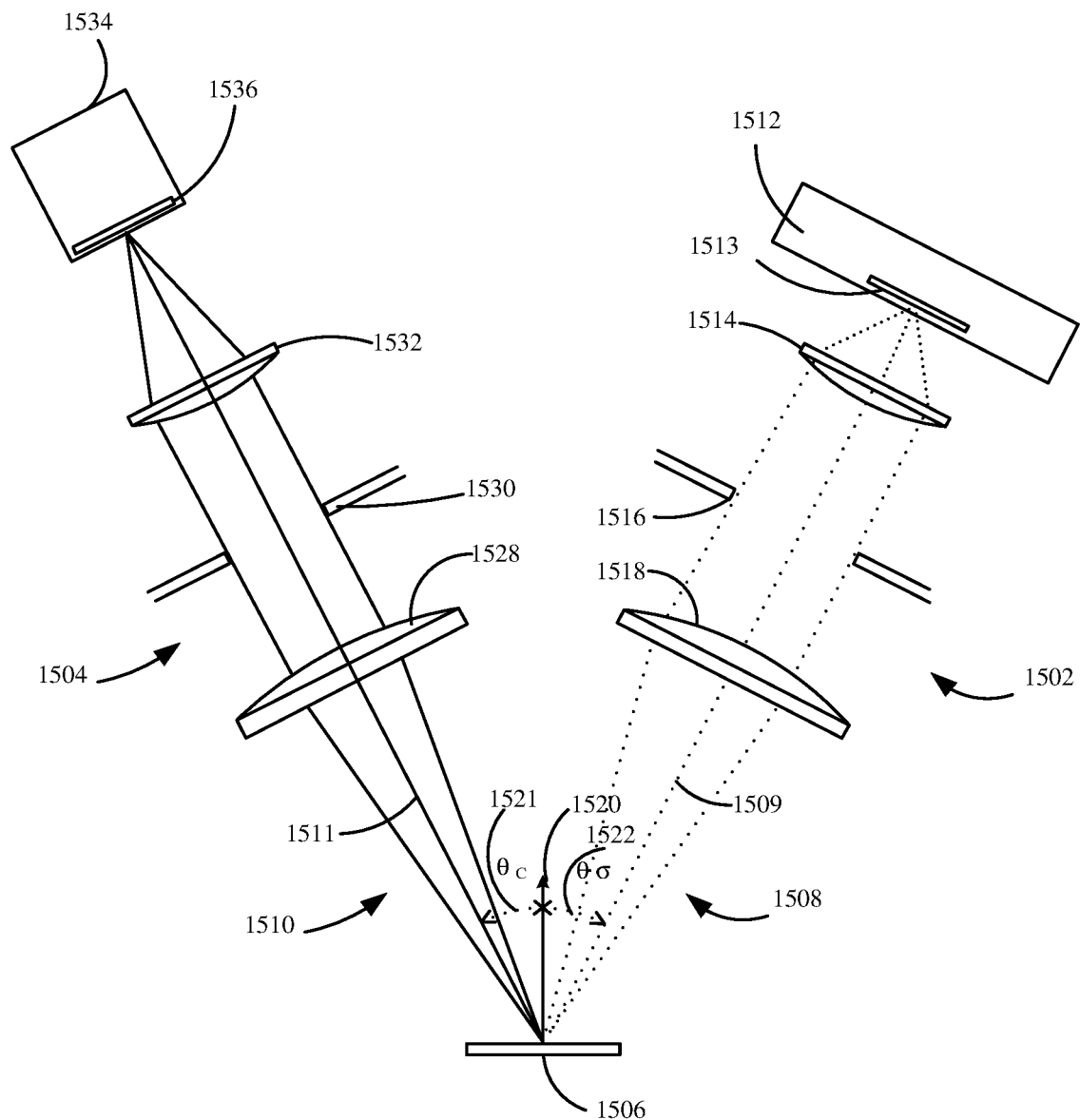
FIG. 21 is a diagrammatic view showing one example of an optical profilometry system in accordance with an embodiment of the present invention.

FIG. 21 is a diagrammatic view showing one example of an optical profilometry system in accordance with an embodiment of the present invention. System 1500 includes illumination source 1502, imaging system 1504, specular target 1506, illumination 1508, illumination chief ray 1509, reflection 1510, reflection chief ray 1511, normal vector 1520, angle of reflectance 1521, and angle of incidence 1522. Illumination source 1502 includes light generator 1512 (e.g a structured light generator), spatial light modulator 1513 (e.g a digital micromirror device), lens 1514, aperture 1516, and lens 1518. Illumination source 1502 could comprise digital light processing (DLP), transmissive liquid crystal, liquid crystal on silicon (LCOS) and any other suitable techniques for projecting a structured light pattern. Imaging system 1504 includes lens 1528, aperture 1530, lens 1532, camera 1534, and image plane 1536. System 1500 comprises a telecentric lens system.

System 1500 is similar to previous embodiments herein described except that the numerical apertures of the illumination source and imaging system are equivalent. With equivalent numerical apertures, the height errors due to the specular reflection, as previously described, are balanced between the apertures thus minimizing the specular reflection measurement error. While system 1500 is illustratively shown with only one camera, it is contemplated that system 1500 could include multiple cameras. Additionally, system 1500 could include a beam splitter, and any adjustment mechanisms, adjustment techniques, adjustable lens assemblies, or adjustable optics herein described.

Although the present invention has been described with reference to preferred embodiments, workers skilled in the art will recognize that changes may be made in form and detail without departing from the spirit and scope of the invention. Moreover, while embodiments of the present invention have been generally described with an optical phase profilometer system, the techniques, methods, and systems described herein are practicable with any number of optical profilometers and other optical imaging systems.

What is claimed is:

1. A system for generating a three-dimensional height image of a reflective target comprising:
    an illumination source configured to generate a patterned illumination on the target;
    a camera configured to acquire an image of the patterned illumination on the target;
    the illumination source and camera being aligned at equal and opposite angles relative to target normal such that the camera acquires a specular image of the patterned illumination; and
    a controller coupled to the illumination source and the camera and configured to generate a height image of the target based on the acquired image, the generated height image being used by the controller to determine a plurality of x, y, z coordinates on the target and a surface gradient of the target relative to a focus plane of the system, and employ a height correction offset function that describes z, coordinate error at each x, y, z, and surface gradient, to correct measurement error during sensor operation for x, y, z, and surface gradient.

2. The system of claim 1, wherein the illumination source comprises a telecentric lens assembly.

3. The system of claim 1, wherein the camera comprises a telecentric lens assembly.

4. The system of claim 1, wherein the illumination source comprises a numerical aperture smaller than a numerical aperture of the camera.

5. The system of claim 1, wherein the illumination source comprises a numerical aperture larger than a numerical aperture of the camera.

6. The system of claim 1, wherein the height image is segmented by the controller based on surface reflectivity of the target.

7. A system for generating a three-dimensional height image of a reflective target, the system comprising:
    an illumination source configured to generate a patterned illumination on the target;
    a camera configured to acquire a first image of the patterned illumination on the target;
    the illumination source and camera being aligned at equal and opposite angles relative to the target such that the camera acquires a specular image of the patterned illumination; and
    a controller coupled to the illumination source and the camera configured to generate an estimated height image of the target based on the first image, the estimated height image being used by the controller to determine a plurality of estimated x, y and z coordinates on the target, and an estimated surface gradient of the target, relative to a focus plane of the system, the controller being configured to generate a corrected height image output of the target based on the estimated height image and a height correction offset function that describes z coordinate error at each x, y, z, and surface gradient.

8. The system of claim 7, wherein the illumination source comprises a telecentric lens assembly.

9. The system of claim 7, wherein the camera comprises a telecentric lens assembly.

10. The system of claim 7, wherein the illumination source has a numerical aperture smaller than a numerical aperture of the camera.

11. The system of claim 7, wherein the illumination source has a numerical aperture larger than a numerical aperture of the camera.

12. The system of claim 7, wherein the height correction offset function comprises a least-squares fit.

13. The system of claim 7, wherein the estimated height image is segmented by the controller based on surface reflectivity of the target.

14. A method of generating three-dimensional height images of a reflective target, the method comprising:
   placing a target to be imaged at a first orientation at which a position, height and slope of the target at the first orientation is known, the target having at least one specular surface;
   projecting, with an illumination source placed at a first point of view, a first patterned illumination onto the target;
   capturing, with a camera placed at a second point of view, a first image of the first patterned illumination, wherein the second point of view is positioned at an equal and opposite angle relative to the first point of view and target normal;
   generating a first height image of the target based upon the first captured image;
   determining a first position, a first height, and a first slope of the target based on the first height image;
   calculating a first error based on a comparison of the determined first position, first height, and first slope from the first height image to the known position, the known height and the known slope of the target at the first orientation;
   tilting the target to a second orientation at which a position, height, and slope of the target at the second orientation is known and wherein at least the slope and height of the target at the second orientation is different from the slope and height of the target at the first orientation;
   projecting, with the illumination source, a second patterned illumination onto the target;
   capturing, with the camera, a second image of the second patterned illumination;
   generating a second height image of the target based upon the second captured image;
   determining a second position, a second height, and a second slope of the target based on the second height image;
   calculating a second error based on a comparison of the determined second position, second height, and second slope from the second height image to the known position, the known height and the known slope of the target at the second orientation;
   calculating a best fit function based on the first error and the second error;
   storing the best fit function; and
   using the best fit function to compensate subsequent height images.

15. The method of claim 14, wherein the illumination source comprises a numerical aperture smaller than a numerical aperture of the camera.

16. The method of claim 14, wherein the illumination source comprises a numerical aperture larger than a numerical aperture of the camera.

17. The method of claim 14, wherein the illumination source comprises a telecentric lens assembly.

18. The method of claim 14, wherein the camera comprises a telecentric lens assembly.

19. A system for generating a three-dimensional height image of a reflective target, the system comprising:
   a first, a second and a third operative illumination source and camera pair, the illumination sources configured to generate patterned illuminations on a target and the cameras being aligned at equal and opposite angles relative to target normal and their respective illumination source and configured to capture images of the patterned illuminations generated by their respective illumination source, wherein the illumination sources are aligned, relative to the target, at different azimuths, the azimuths separated by 120 degrees; and
   a controller coupled to the first, second, and third operative illumination source and camera pairs, the controller being configured to generate a height image of the target based on acquired images of the patterned illuminations.

20. The system of claim 1, wherein the illumination source comprises a numerical aperture equal to a numerical aperture of the camera.

21. The method of claim 14, wherein the illumination source has a numerical aperture equal to a numerical aperture of the camera.

22. The system of claim 19, wherein each illumination source has a numerical aperture equal to a respective camera.

* * * * *